(12) United States Patent
Aguinaga et al.

(10) Patent No.: US 7,517,123 B2
(45) Date of Patent: Apr. 14, 2009

(54) MOTORIZED LAMP ADJUSTER

(75) Inventors: Raul Aguinaga, Milwaukee, WI (US); Scott T. Fladhammer, Racine, WI (US); Mark Roszko, Twin Lakes, WI (US)

(73) Assignee: Asyst Technologies, LLC, Kenosha, WI (US)

( * ) Notice: Subject to any disclaimer, the term of this patent is extended or adjusted under 35 U.S.C. 154(b) by 291 days.

(21) Appl. No.: 10/574,370

(22) PCT Filed: Oct. 21, 2004

(86) PCT No.: PCT/US2004/034711

§ 371 (c)(1),
(2), (4) Date: Apr. 3, 2006

(87) PCT Pub. No.: WO2005/042304

PCT Pub. Date: May 12, 2005

(65) Prior Publication Data
US 2007/0041206 A1 Feb. 22, 2007

(51) Int. Cl.
*F21V 19/02* (2006.01)
*F21V 21/14* (2006.01)

(52) U.S. Cl. .................. 362/528; 362/515; 362/524; 362/529

(58) Field of Classification Search .......... 362/507, 362/512, 514–515, 524, 528–529
See application file for complete search history.

(56) References Cited

U.S. PATENT DOCUMENTS

| | | |
|---|---|---|
| 4,524,407 A | 6/1985 | Igura |
| 4,916,587 A | 4/1990 | Hirose et al. |
| 5,181,429 A | 1/1993 | Sieber |
| 5,251,114 A | 10/1993 | Cantin et al. |
| 5,394,318 A | 2/1995 | Komachi |
| 5,580,149 A | 12/1996 | Kusagaya |
| 5,673,991 A | 10/1997 | Eickhoff et al. |
| 5,707,133 A | 1/1998 | Burton |
| 5,906,431 A | 5/1999 | Chianale et al. |
| 5,911,502 A | 6/1999 | Zillgitt et al. |
| 6,012,829 A | 1/2000 | Natchoo |
| 6,238,071 B1 | 5/2001 | Fratty |
| 6,257,747 B1 | 7/2001 | Burton |
| 6,286,985 B1 | 9/2001 | Ohshio et al. |
| 6,345,905 B1 | 2/2002 | Kibayashi et al. |
| 6,428,196 B1 | 8/2002 | Deguchi et al. |
| 6,568,837 B2 | 5/2003 | Denley |
| 6,623,147 B2 | 9/2003 | Hayami et al. |
| 6,641,292 B2 | 11/2003 | Miki et al. |
| 6,773,153 B2 | 8/2004 | Burton |
| 2002/0018348 A1* | 2/2002 | Miki et al. ............ 362/514 |

FOREIGN PATENT DOCUMENTS

EP 0956998 11/1999

* cited by examiner

*Primary Examiner*—Sandra O'Shea
*Assistant Examiner*—Jason Moon Han
(74) *Attorney, Agent, or Firm*—Brian G. Gilpin; Godfrey & Kahn, S.C.

(57) ABSTRACT

A motorized adjuster (30) is used for adjusting the aim of a lamp. The adjuster has a housing (32) and a motor (36). An output shaft (38) passes through the housing and is operably connected to the motor. A ball stud (60) is moved by actuation of the motor and may also be moved by manual operation (41). A clutching feature may be included to prevent damage due to over adjustment attempts.

10 Claims, 18 Drawing Sheets

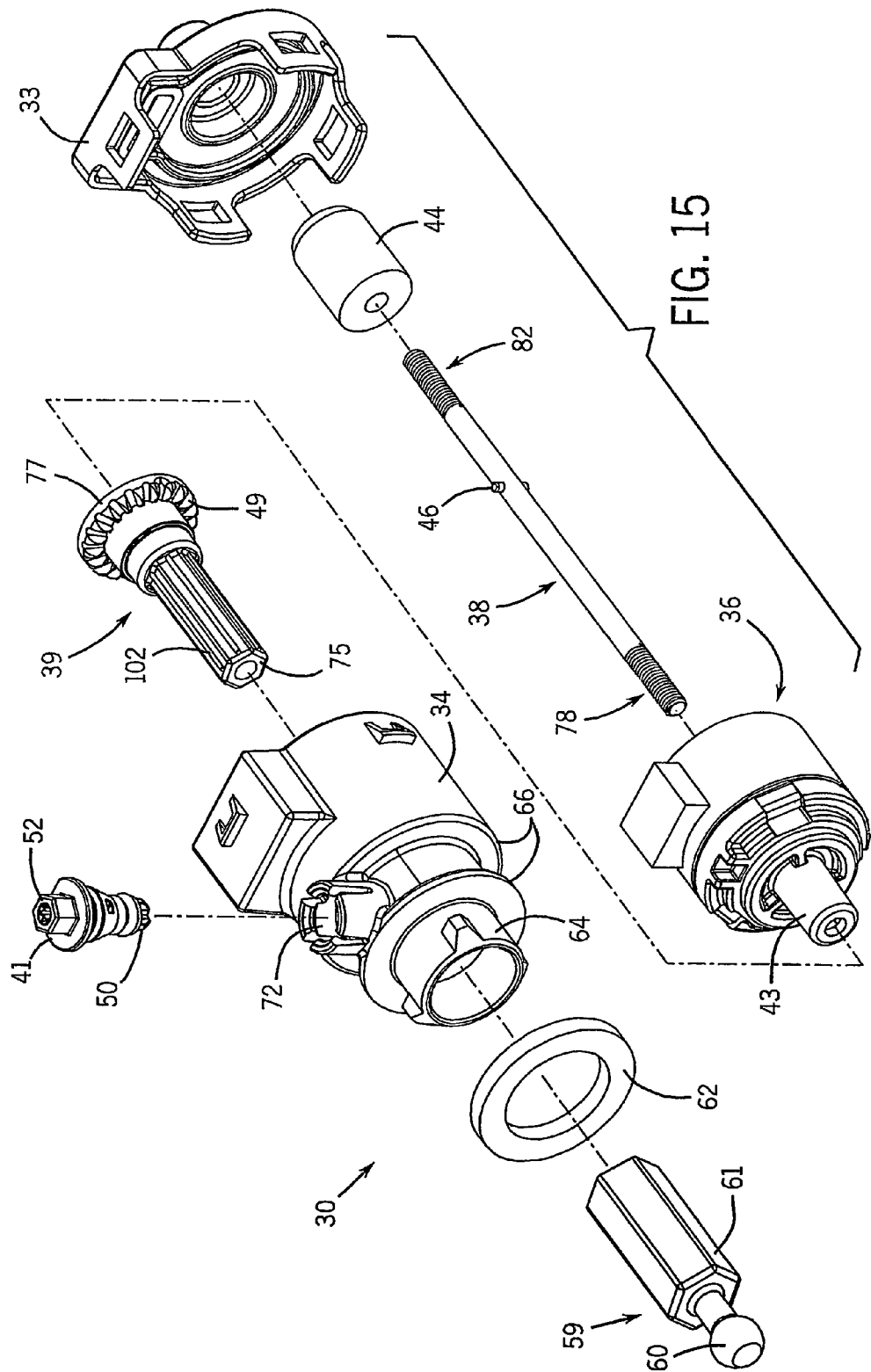

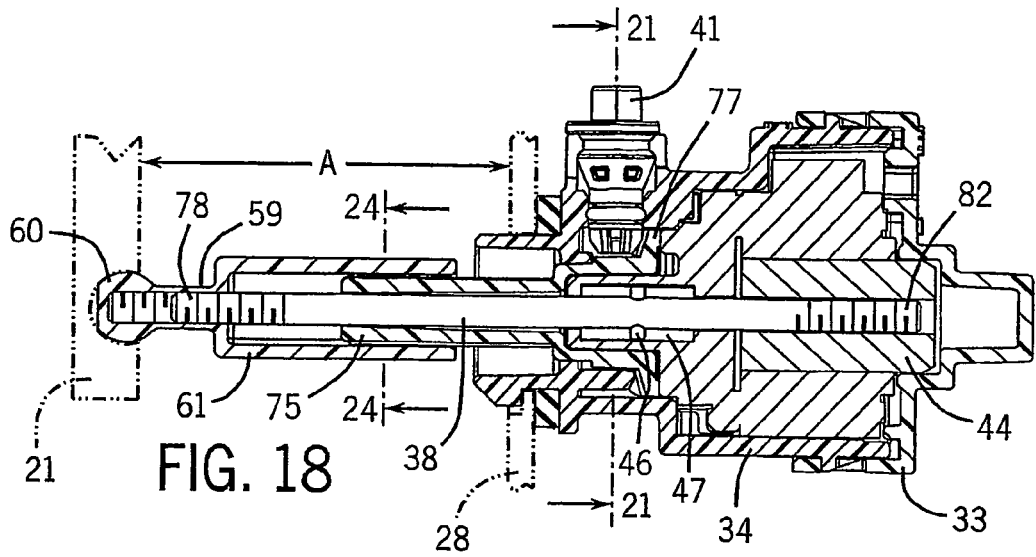
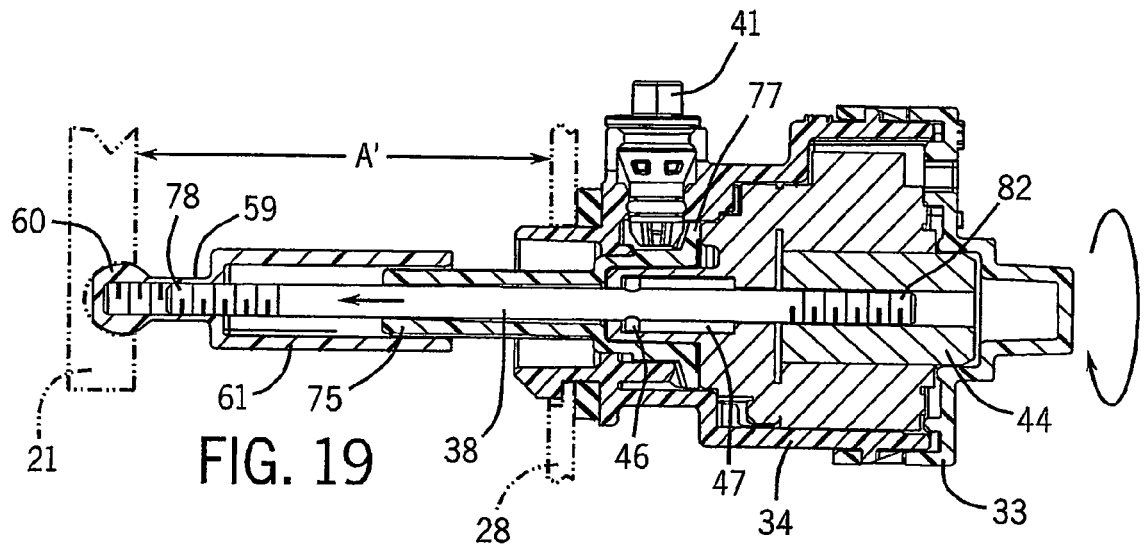
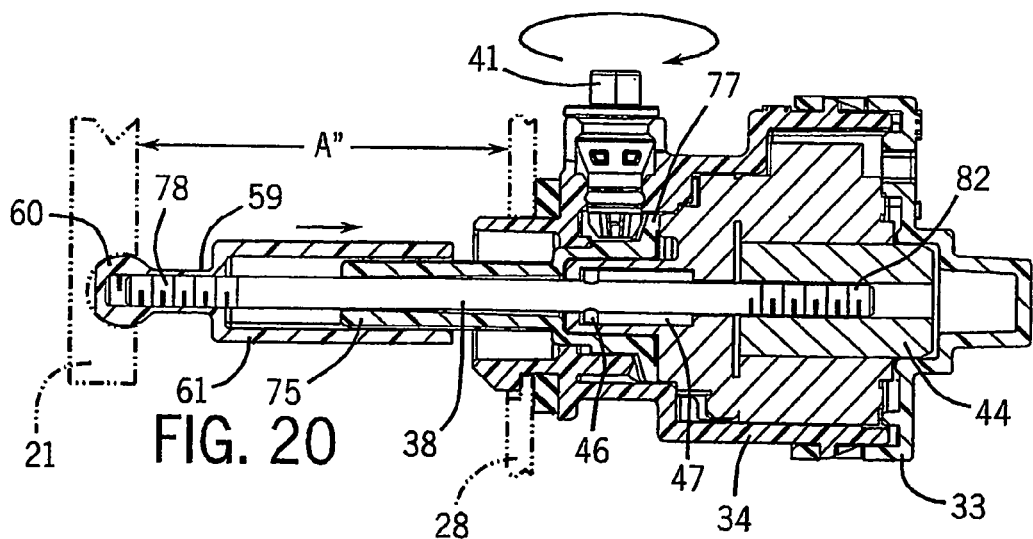

MOTORIZED LAMP ADJUSTER

BACKGROUND OF THE INVENTION

The present invention relates generally to adjusters which are used to adjust the aim of a vehicle lamp. Specifically, this invention relates to a motorized lamp adjuster for adjusting the aim of a vehicle lamp using motorized or manual operation.

Vehicles such as automobiles typically have several lamps including head lamps and fog lamps. These lamps typically include a reflector sealed to a lens with a bulb therein. These lamps are securely fit into mounting brackets. The lamps are usually pivotally engaged to the mounting bracket at a plurality of points. The mounting brackets are attached to the vehicle. Together, a lamp and a mounting bracket form a complete lamp assembly. Once the lamp assembly has been manufactured and installed into a vehicle, the aim of the lamp must be adjusted to the proper aim. As a result of accidents, maintenance, and normal vibrations and wear, the aim of the lamp must be occasionally adjusted during the lifetime of the vehicle.

One method of adjusting the aim of the lamp involves using an adjuster. The adjuster may be formed as part of the mounting bracket or may be a separate part that communicates with both the lamp and the mounting bracket. One known type of adjuster comprises a housing and an output shaft extending therefrom. The output shaft is engaged to the lamp. Actuation or operation of the adjuster causes the output shaft to move with respect to the lamp assembly. Such movement causes the lamp to pivot with respect to the mounting bracket, thereby adjusting the aim of the lamp.

One example of this type of adjuster, such as the one disclosed in U.S. Pat. No. 6,257,747 to Burton, requires manual operation. The housing of the adjuster has an opening and a gear positioned inside the housing. The gear is functionally engaged to the output shaft. A driver is inserted into the opening and interacts with the gear. Actuation of the driver results in rotation of the gear and engaged output shaft. The gear translates actuation of the driver into movement of the output shaft. Numerous variations and improvements exist on this concept.

A manual adjuster has limited applicability. Many countries require a driver to be able to adjust the aim of a vehicle's lamps from inside the cabin. Additionally, certain vehicles are now offering lamps that track and illuminate the direction of the vehicle or that adjust the aim of the lamp to compensate for the pitch of the road or weight of the vehicle (i.e. driving on hilly terrain or with a heavy load in the vehicle). The aim of the lamp is automatically adjusted as the steering wheel is turned or as a result of the relative pitch of the suspension. A computer coordinates the degree of turn of the steering wheel, the speed of the vehicle, and/or the pitch of the suspension with the aim of the lamps. This coordination requires a high degree of precision. A driver cannot safely turn a steering wheel and manually adjust the aim of the vehicle's lamps at the same time.

A number of motorized lamp adjusters have been developed to provide improved functionality. Many of these adjusters provide for both manual and motorized operation. In practice, the adjusters are manually operated to aim the lamp during manufacture, maintenance, and repair of the vehicle. The adjusters rely on motorized operation to aim the lamp while the vehicle is on the road. These adjusters can be connected to control units that provide for automatic adjustments while the vehicle is driven. Examples of such adjusters are disclosed in U.S. Pat. No. 5,394,318 to Komachi; U.S. Pat. No. 5,673,991 to Eickhoff et al.; and U.S. Pat. No. 6,012,829 to Natchoo. These adjusters all use an electric motor to longitudinally move a output shaft. The motors are offset from the output shaft and located inside the adjuster housing. These adjusters rely on a series of gears, speed reducers, circuits, potentiometers, and transmissions to translate the power generated by the motor into longitudinal movement of the output shaft. As such, these adjusters employ a series of parts. Each part must be separately manufactured. The parts are then assembled inside the housing to form the adjuster. Using multiple parts increases the potential for malfunction, breakage and general wearing of the adjuster. Further, using a series of parts results in a larger housing and thus a larger adjuster. Such an adjuster requires more space in a vehicle, thereby affecting the overall design and manufacture of the vehicle and making the overall cost of both the adjuster and the vehicle more expensive.

Accordingly, a need exists for an improved motorized lamp adjuster that solves these and other deficiencies in the prior art. Of course, the present invention may be used in a multitude of situations where similar performance capabilities are required.

SUMMARY OF THE INVENTION

The present invention provides a motorized lamp adjuster that is cost-effective, provides improved functionality, and which solves certain of the problems raised or not solved by existing designs.

The adjuster includes a housing, a motor, and an output shaft. In one embodiment, the output shaft passes through the housing and the motor and is functionally engaged by the motor such that operation of the motor causes axial movement of the output shaft. An anti-rotation gear is ideally positioned inside the housing such that the output shaft passes through and is functionally engaged by the anti-rotation gear. The anti-rotation gear is used to operate the adjuster manually. The anti-rotation gear also prevents the output shaft from rotating when the motor is in use. The anti-rotation gear is positioned in the housing such that the anti-rotation gear is biased against rotation. The output shaft preferably has a rotation point and the anti-rotation gear is configured to geometrically mate with the rotation point such that manual rotation of the anti-rotation gear causes the output shaft to rotate. The adjuster is operated manually by inserting a driver into the housing and rotating the driver. The driver can be inserted through a driver input locator in the housing. Once inserted, the driver functionally engages the output shaft through the anti-rotation gear such that rotation of the driver causes the output shaft to rotate and move axially. The driver may alternatively be included as part of the adjuster assembly.

In another embodiment, a drive gear is positioned within the housing such that the output shaft passes through the drive gear but does not engage the drive gear. Instead, the drive gear engages a ball insert that is functionally engaged to the output shaft. Motorized operation of the adjuster using the motor causes the output shaft to move axially, which in turn causes the ball insert to move axially and effectuate an adjustment to the aim of the lamp. To manually operate the adjuster, a driver engages the drive gear to rotate the drive gear, which rotates the ball insert and causes the ball insert to move axially with respect to the output shaft and effectuate an adjustment to the aim of the lamp. The output shaft does not rotate or move axially during manual operation. In another embodiment, the functional engagement between the ball insert and the output shaft includes a clutching mechanism.

The present invention may also include a lamp assembly. The lamp assembly has a mounting bracket, a lamp pivotally engaged within the mounting bracket, and an adjuster in accordance with any embodiment of the present invention. The adjuster is securely engaged to the mounting bracket and functionally engaged to the lamp. Further, a power source and/or control unit is electrically connected to the motor if motorized adjustment is desired.

While one possible application of the present invention is in connection with a vehicle lamp, many other applications are possible and references to use in connection with a vehicle lamp should not be deemed to limit the uses of the present invention. The terms "lamp," "mounting bracket," "lamp assembly," "output shaft," "housing" or "ball" as used herein should not be interpreted as being limited to specific forms, shapes, or compositions. Rather, the parts may have a wide variety of shapes and forms and may be composed of a wide variety of materials. These and other objects and advantages of the present invention will become apparent from the detailed description, claims, and accompanying drawings.

DESCRIPTION OF THE DRAWINGS

FIG. 15 is an exploded view of the motorized adjuster of FIG. 14;

FIG. 18 is a partial cross sectional view of the motorized adjuster of FIG. 14 taken along plane 18-18 with a lamp and mounting bracket shown in phantom;

FIG. 19 is a partial cross sectional view of the motorized adjuster of FIG. 14 taken along plane 18-18 with a lamp and mounting bracket shown in phantom, and illustrating motorized operation of the adjuster;

FIG. 20 is a partial cross sectional view of the motorized adjuster of FIG. 14 taken along plane 18-18 with a lamp and mounting bracket shown in phantom, and illustrating manual operation of the adjuster;

DETAILED DESCRIPTION OF THE PREFERRED EMBODIMENTS

Figure 1:
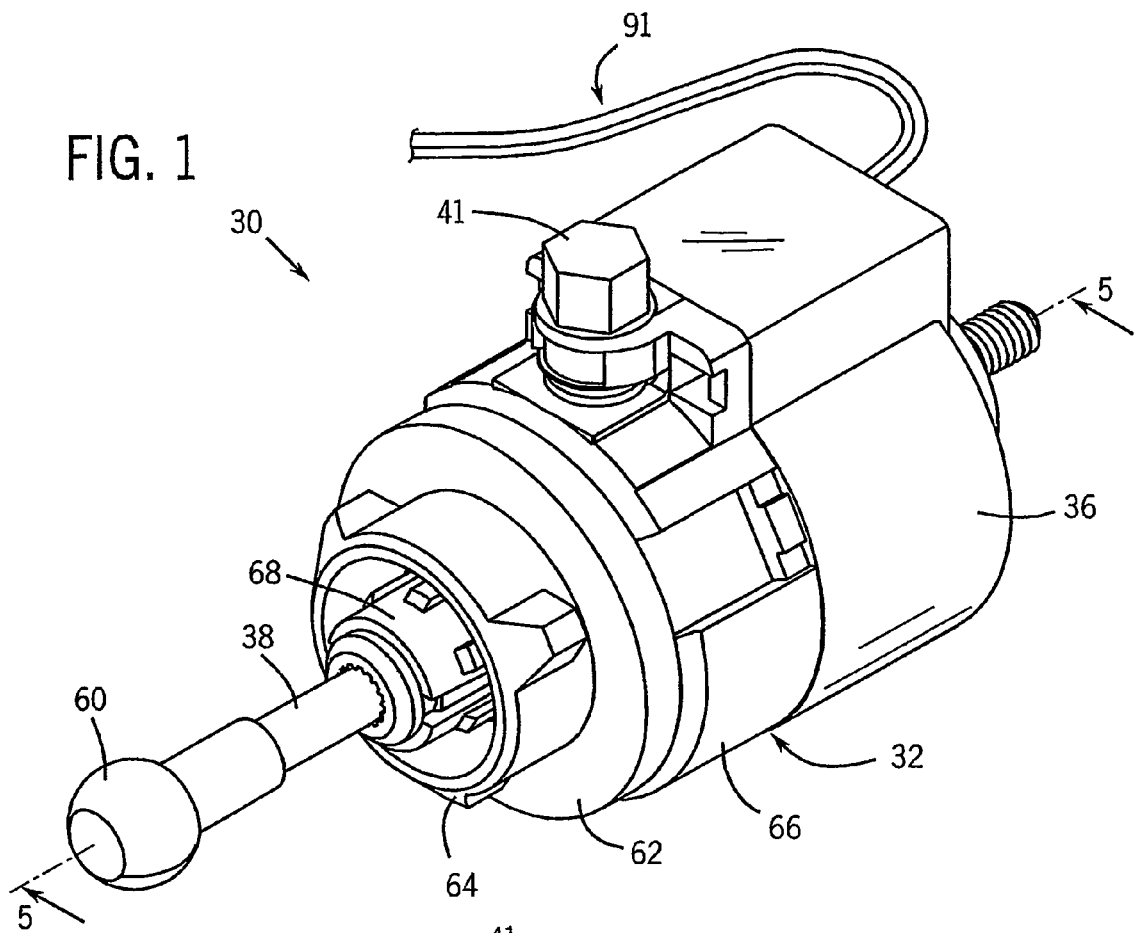
FIG. 1 is a perspective view of a motorized adjuster in accordance with one embodiment of the present invention.

Illustrative embodiments of a motorized lamp adjuster (identified generally as 30) in accordance with the present invention are shown in FIGS. 1 through 31. While the invention may be susceptible to embodiment in different forms, there are shown in the drawings, and are described herein in detail, certain illustrative embodiments with the understanding that the present disclosure is to be considered an exemplification of the principles of the invention, and is not intended to limit the invention to those embodiments illustrated and described herein. Additionally, features illustrated and described with respect to one embodiment could be used in connection with other embodiments.

Figure 11:
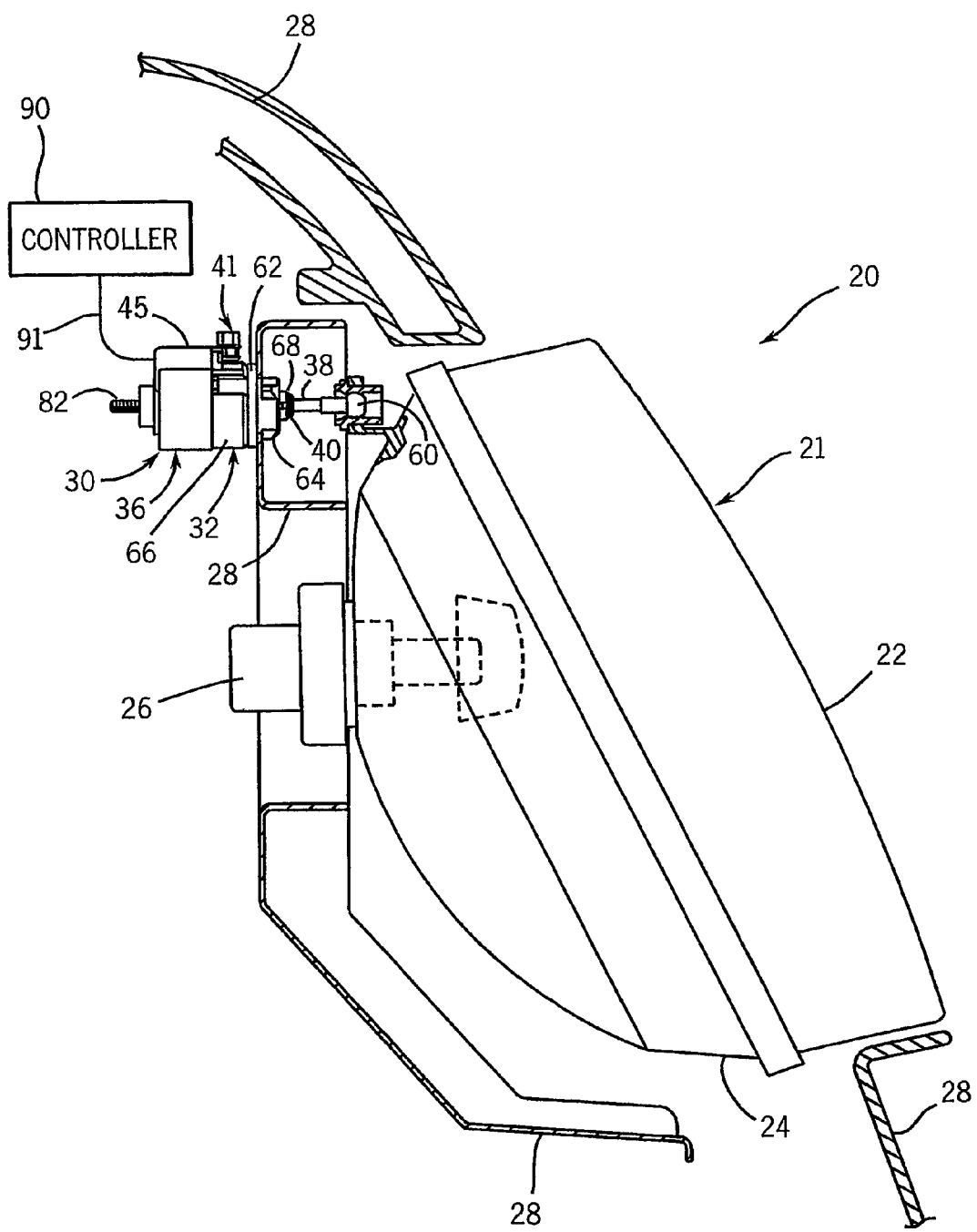
FIG. 11 is a partial cross sectional view of a lamp assembly in accordance with one embodiment of the present invention.
Figure 13:
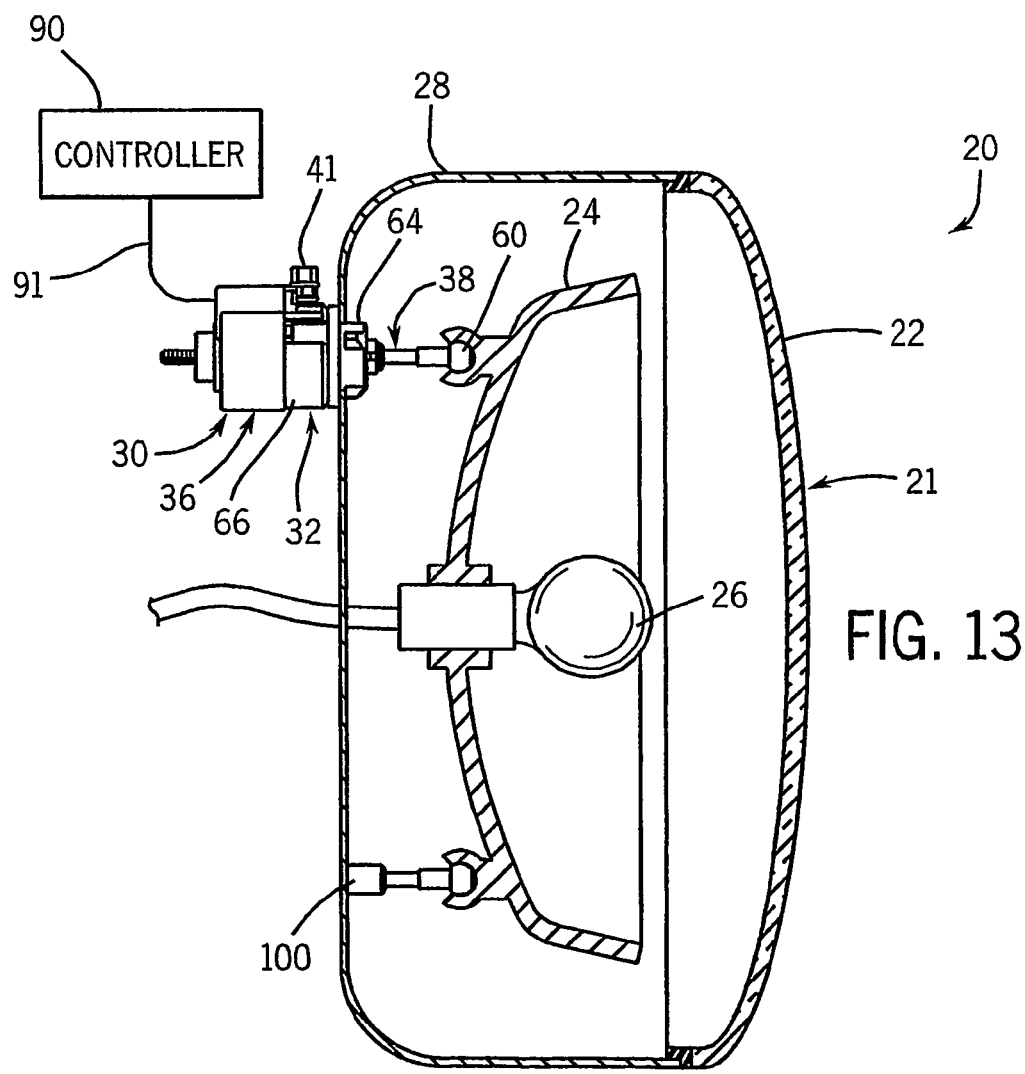
FIG. 13 is a partial cross sectional view of a lamp assembly in accordance with one embodiment of the present invention.
Figure 14:
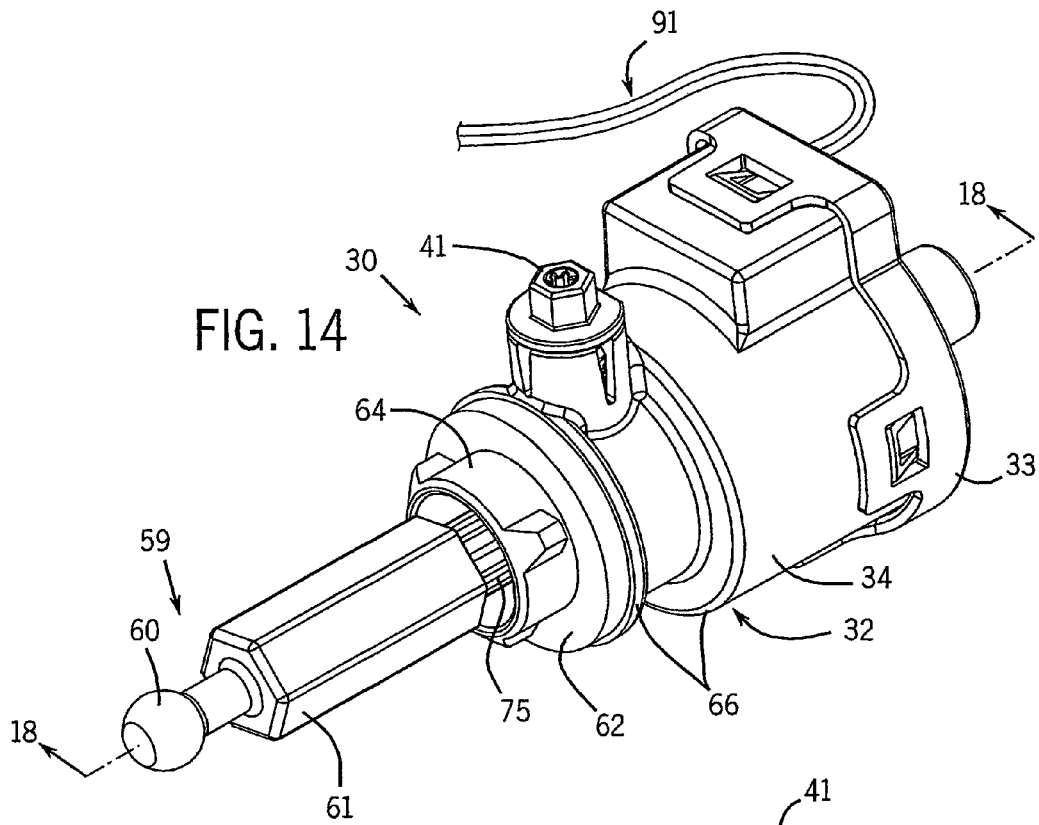
FIG. 14 is a perspective view of a motorized adjuster in accordance with another embodiment of the present invention.
Figure 17:
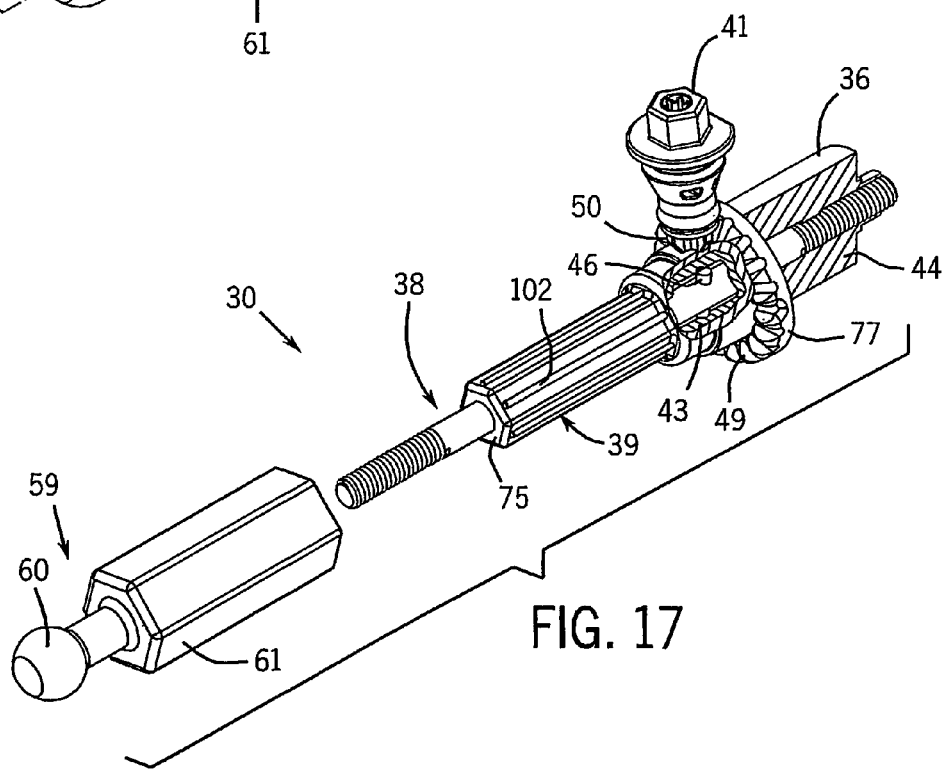
FIG. 17 is a perspective view of the motorized adjuster of FIG. 14, shown with the housing removed and the motor and drive gear in partial cross-section.
Figure 26:
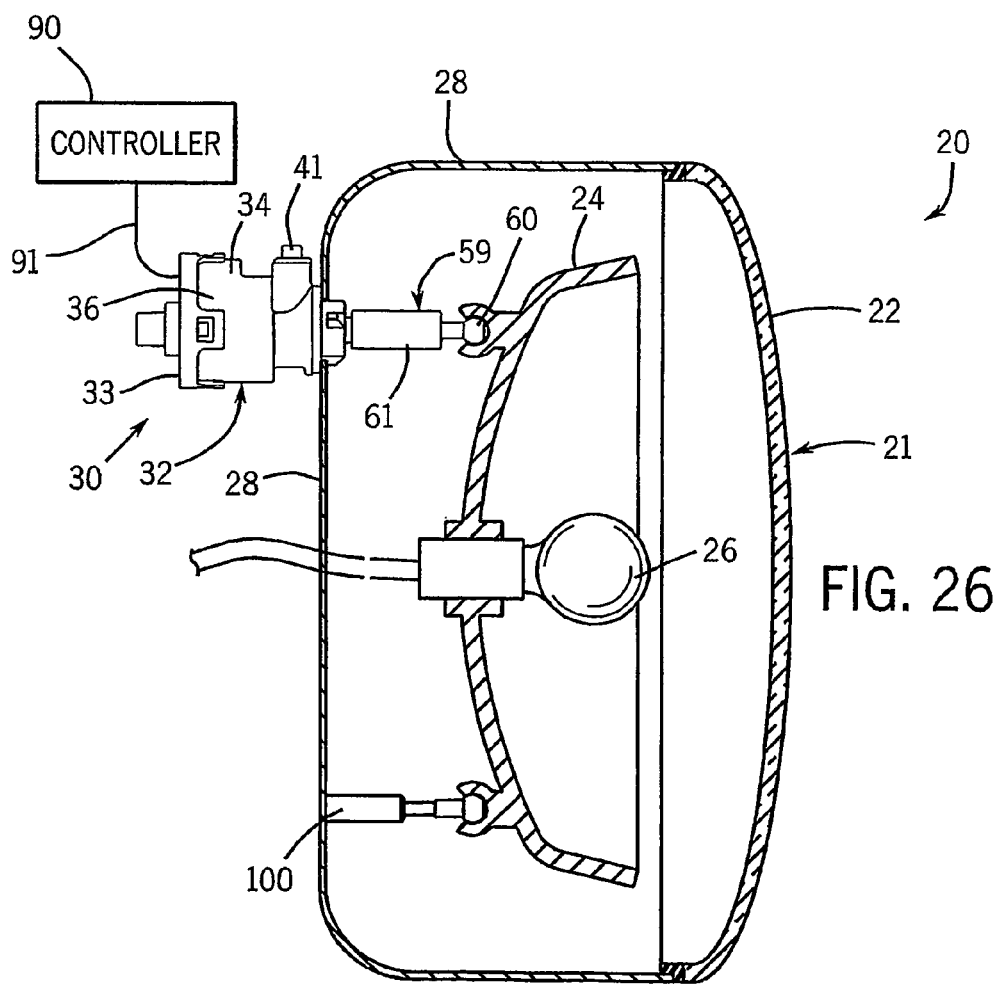
FIG. 26 is a partial cross sectional view of a lamp assembly in accordance with one embodiment of the present invention.
Figure 25:
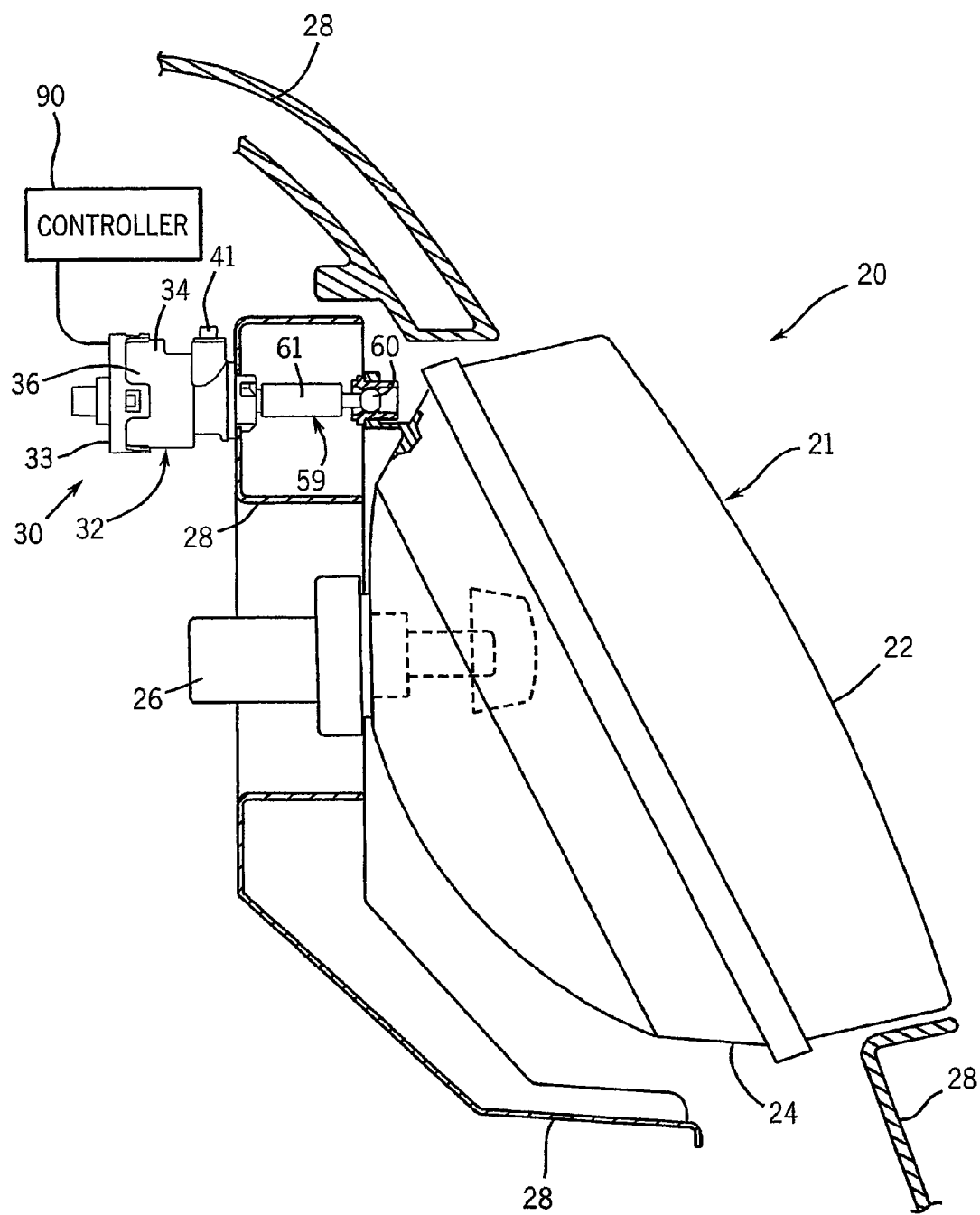
FIG. 25 is a partial cross sectional view of a lamp assembly in accordance with one embodiment of the present invention.
Figure 27:
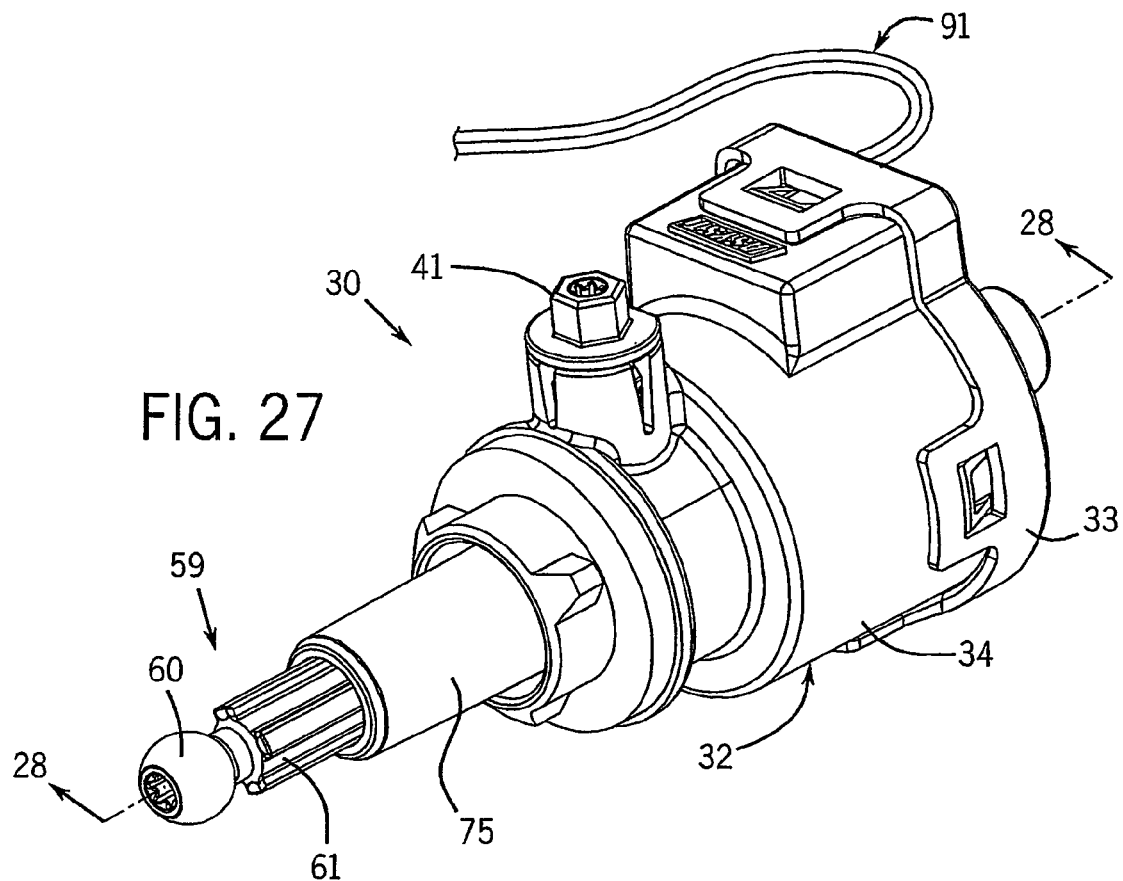
FIG. 27 is a perspective view of a motorized adjuster in accordance with another embodiment of the present invention.
Figure 29:
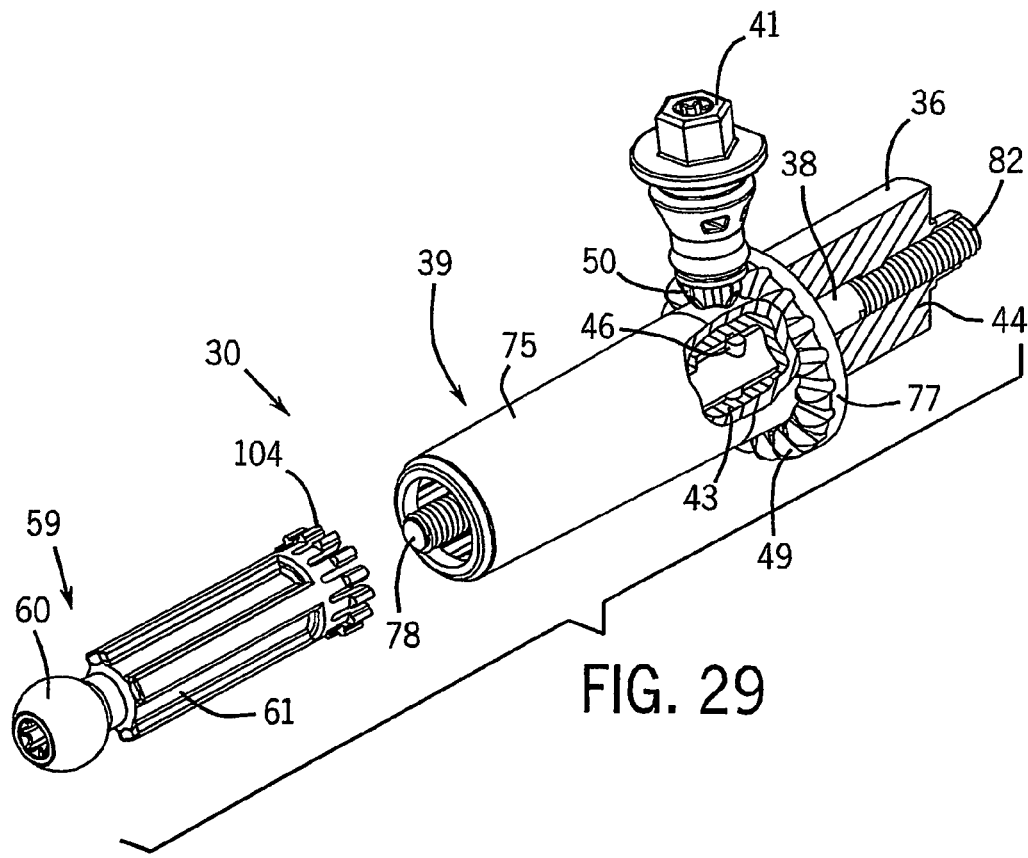
FIG. 29 is a perspective view of the motorized adjuster of FIG. 27, shown with the housing removed and the motor and drive gear in partial cross-section.
Figure 28:
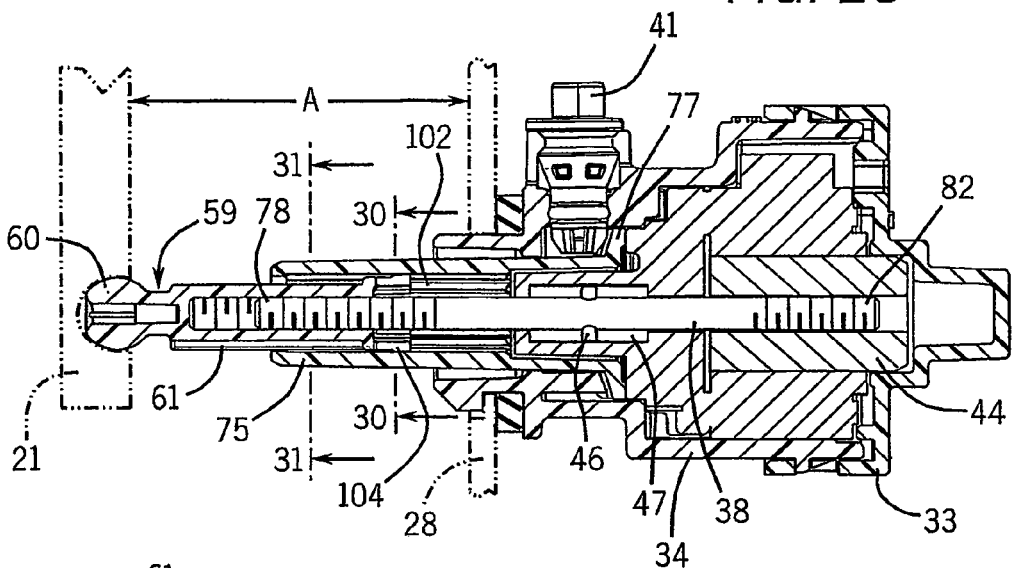
FIG. 28 is a partial cross sectional view of the motorized adjuster of FIG. 27 taken along line 28-28 with a lamp and mounting bracket shown in phantom.
Figure 30:
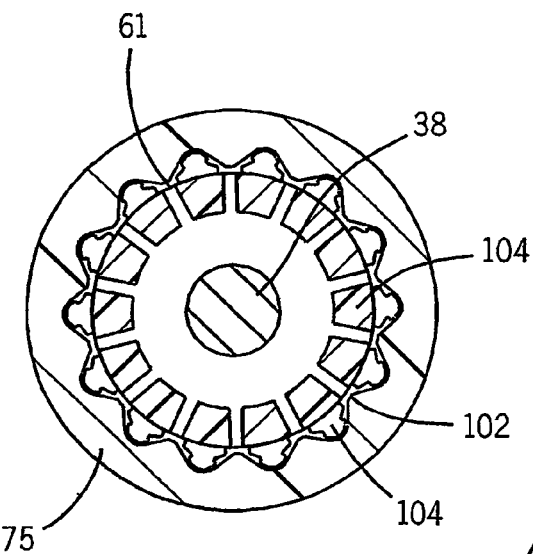
FIG. 30 is a cross-sectional view of the motorized adjuster of FIG. 28 taken along plane 30-30 in FIG. 28; and, FIG. 31 is a cross-sectional view of the motorized adjuster of FIG. 28 taken along plane 31-31 in FIG. 28.
Figure 31:
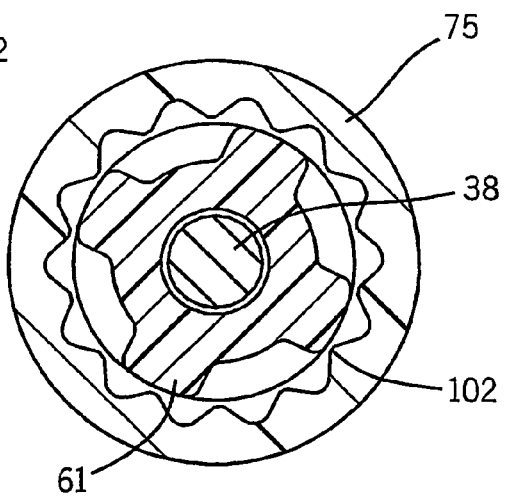

As shown in FIGS. 11, 13, 25 and 26, the adjuster 30 is generally used in connection with a vehicle lamp and forms part of the lamp assembly 20. A lamp assembly 20 typically includes a lamp 21 and a mounting bracket 28. The lamp 21 has a reflector 24 sealed to or otherwise enclosed by a lens 22, and a bulb 26 disposed between the reflector 24 and the lens 22. As shown in FIGS. 11 and 25, the lamp 21 can be pivotally engaged to the mounting bracket 28. As shown in FIGS. 13 and 27, the mounting bracket 28 could form a portion of the lamp 21. In FIGS. 13 and 26, the reflector 24 is mounted to the mounting bracket via a pivot post 100. The adjuster 30 securely engages the mounting bracket 28 and functionally engages the lamp 21. The adjuster 30 may engage any portion of the lamp 21, such as the reflector 24 as shown in FIGS. 11, 13, 25 and 26.

Common to all embodiments shown in FIGS. 1-31 is a housing 32 which engages the mounting bracket 28. The housing 32 can be constructed from any suitable rigid material and manufactured by any suitable technique. It has been found feasible to manufacture the housing from injection molded plastic. As shown in FIGS. 1, 5, 6, 14 and 18-20, the housing 32 has a nose 64 and a body 66. The nose 64 engages the mounting bracket 28. The nose 64 may be securely engaged to the mounting bracket 28 via sliding engagement, snap fit, screw in, or other method. Examples of how an adjuster can be mounted to a bracket are shown in the following U.S. Patents to Burton, the disclosures of which are incorporated herein by reference: U.S. Pat. Nos. 6,474,850; 6,257, 747; 6,050,712; 6,042,254; and 5,707,133. In addition, the adjuster 30 may be mounted or securely engaged to the mounting bracket 28 via sliding engagement, snap fit, screw in, quarter-turn fashion, or other method. As shown in FIGS. 11 and 25, the housing 32 can be engaged to the mounting bracket 28 in a quarter-turn fashion. The mounting bracket 28 has an opening configured to mate with the nose 64. The nose 64 is inserted into the opening and turned, thereby securing the housing 32 to the mounting bracket 28. The nose 64 is ideally turned sixty degrees, however, turns of other degrees would also be possible. As shown in FIGS. 1, 11, 14 and 25, an O-ring or gasket 62 is positioned on the nose 64 and against the body 66. Engagement of the nose 64 with the mounting bracket 28 creates a seal between the body 66, the O-ring or gasket 62, and the mounting bracket 28. Preferably this engagement creates a facial seal between the body 66 and the O-ring 62 and between the O-ring 62 and the mounting bracket 28. It is also possible to integrally form the housing 32 of the adjuster 30 as part of the mounting bracket 28 or other structural parts of the lamp assembly 20.

Also common to all embodiments shown in FIGS. 1-31 is a motor 36 having a rotor 44. The motor 36 is ideally electrically connected to a power supply via a control cord 91 to a connector 92. The power supply is preferably the battery of the vehicle. As shown in FIGS. 11, 13, 25 and 26, the motor 36 is electrically connected to a control unit 90 by control cord 91. The control unit 90 may be an electronic control unit (ECU), computer, electrical signal transmitter, or a switch. Several types of motors could be used, including, but not limited to, a stepper motor such as the NMB Stepper Motor PL35L-02-USNJA, or a linear motor such as the MPL35A-24 linear motor manufactured by Taishan Siang. Although the drawings show the motor 36 and output shaft 38 as separate parts, it is of course also possible to purchase a pre-assembled motor unit in which the output shaft 38 has already been assembled into the motor 36.

Figure 2:
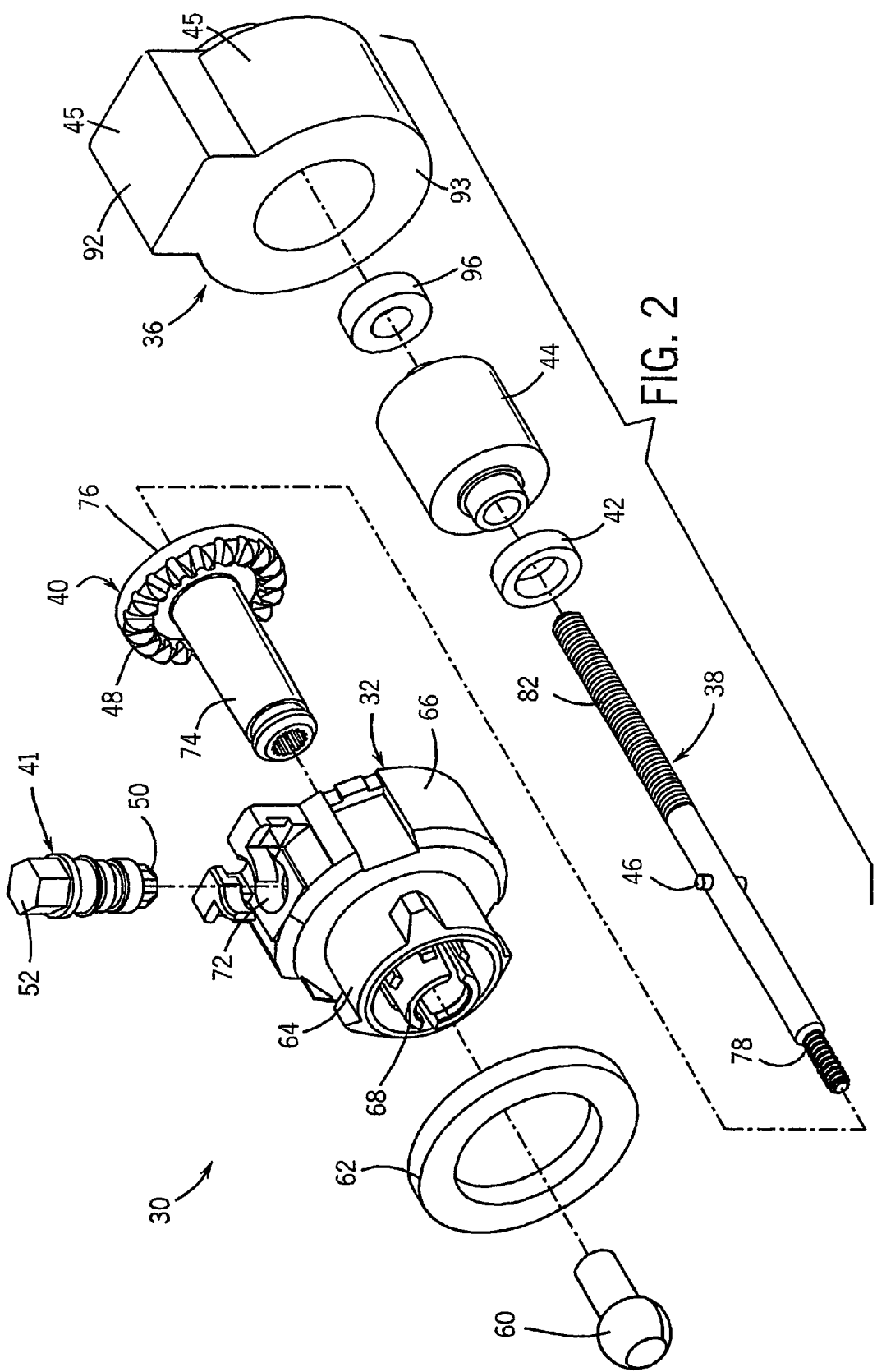
FIG. 2 is an exploded view of the motorized adjuster of FIG. 1.
Figure 3:
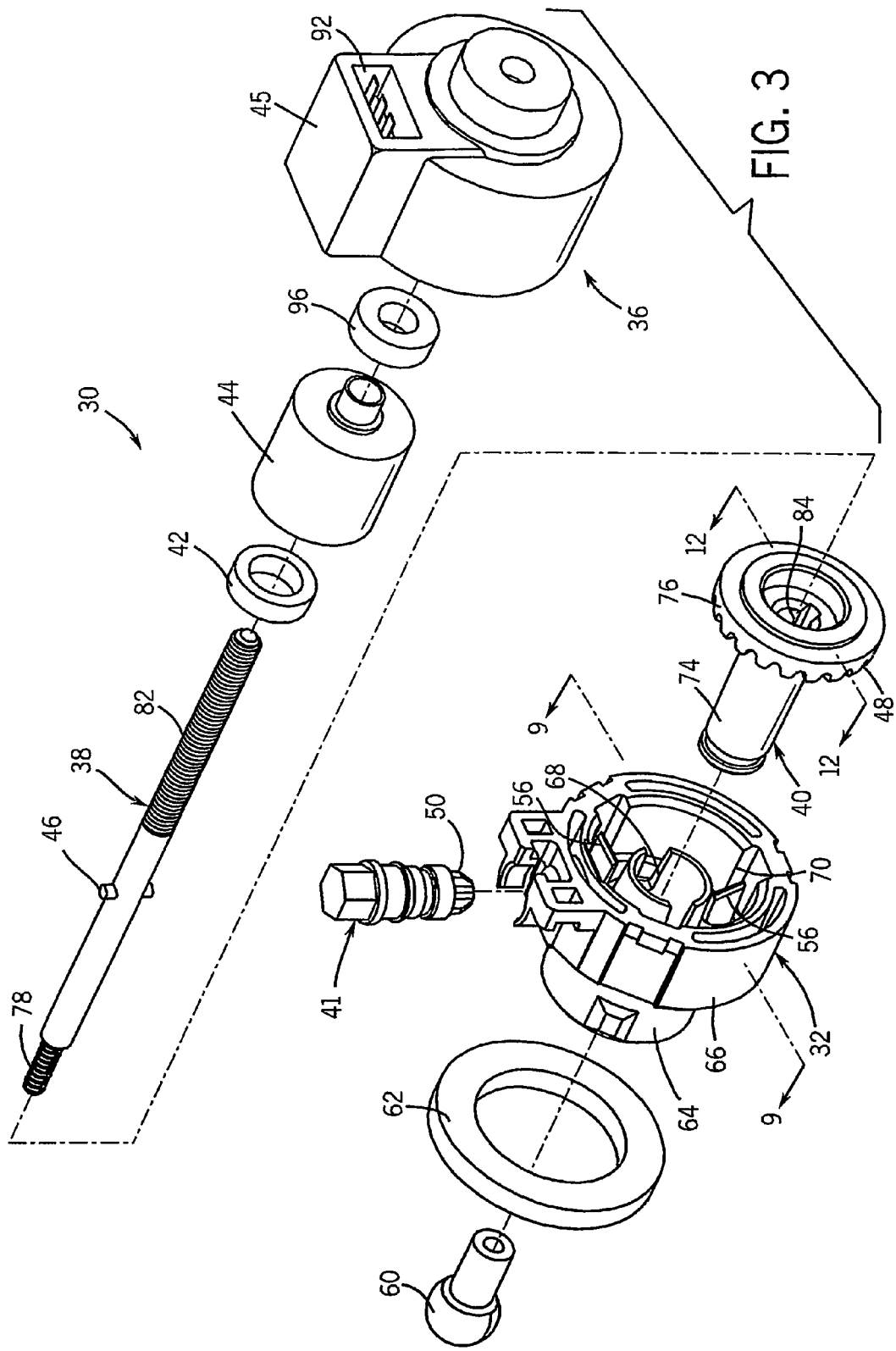
FIG. 3 is an exploded view of the motorized adjuster of FIG. 1.

One embodiment of the adjuster 3 0 of the present invention is illustrated in FIGS. 1-13. As shown in FIGS. 2 and 3, the adjuster 30 includes a number of parts. The adjuster 30 includes a housing 32 and a motor 36. The motor 36is positioned in, or in contact with, the housing 32. A output shaft 38 is positioned in and extends through the housing 32 and the motor 36. The output shaft 38 interacts with and is functionally engaged at one end to the lamp 21, as shown in FIGS. 11 and 13, and engaged to the motor 36 at the other end. An anti-rotation gear 40 is positioned inside the housing 32. The output shaft 38 is inserted into and through the anti-rotation gear 40.

Figure 5:
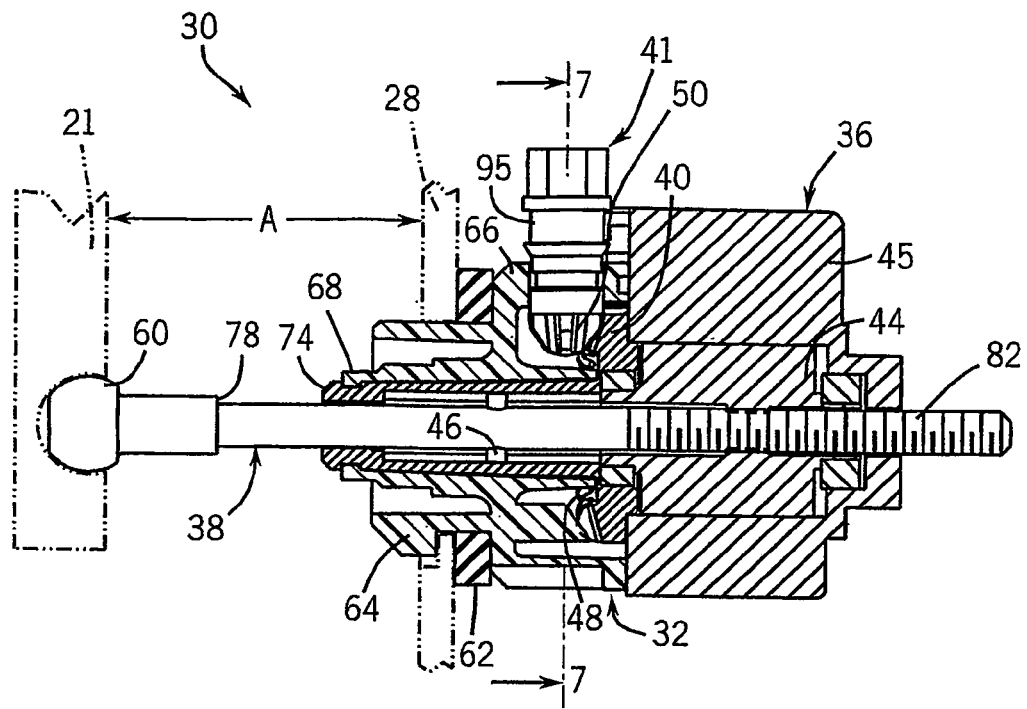
FIG. 5 is a partial cross sectional view of the motorized adjuster of FIG. 1 taken along plane 5-5 with a lamp and mounting bracket shown in phantom.
Figure 6:
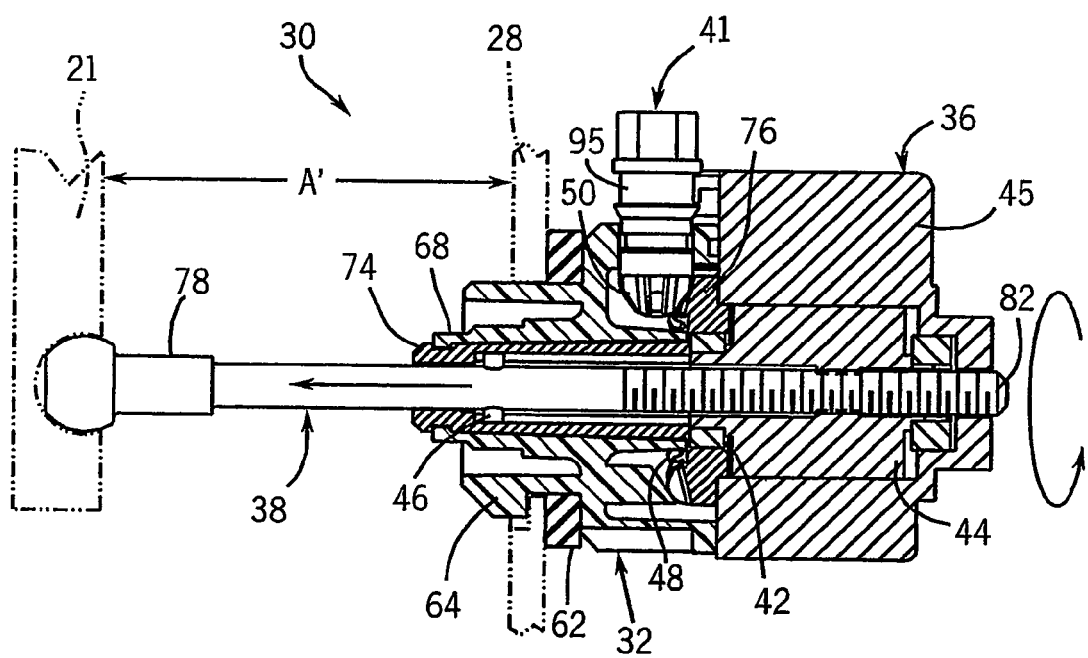
FIG. 6 is a partial cross sectional view of the motorized adjuster of FIG. 1 taken along plane 5-5 with a lamp and mounting bracket shown in phantom, and illustrating motorized operation of the adjuster.
Figure 7:
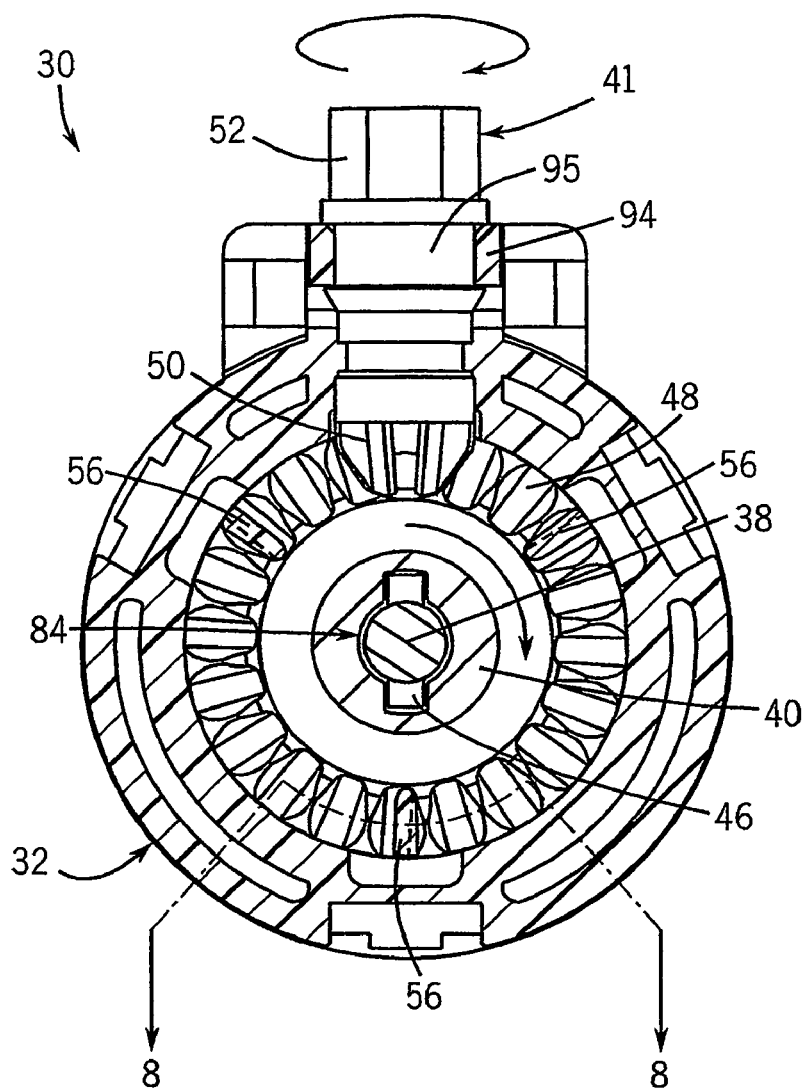
FIG. 7 is a partial cross sectional view of the motorized adjuster of FIG. 5 taken along the plane 7-7 in FIG. 5.
Figure 8:
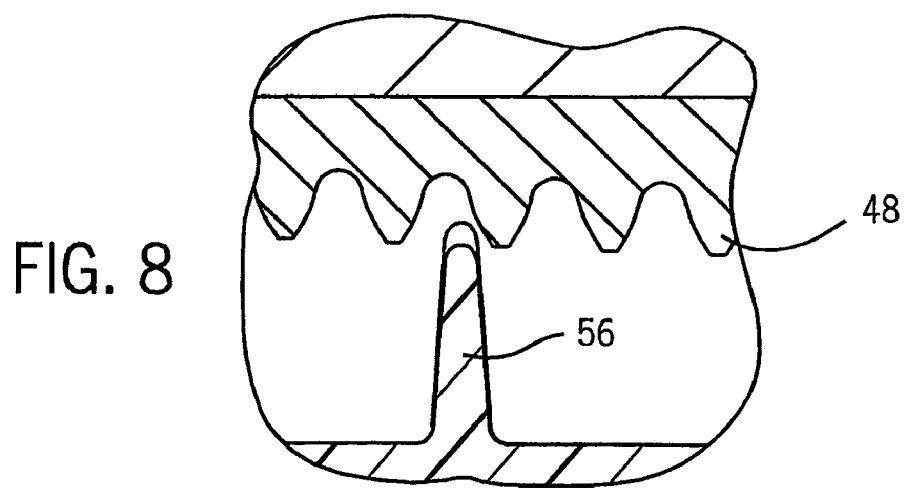
FIG. 8 is a partial cross sectional view of the motorized adjuster of FIG. 7 taken along the plane 8-8 in FIG. 7.

As shown in FIGS. 2, 3, 5, and 6, the body 66 has a receptor 68 which extends into the nose 64, a recess 70, and a driver input locator 72. An anti-rotation gear 40 is positioned inside the body 66 of the housing 32. The anti-rotation gear 40 has an extension 74 and a head 76 with a plurality of gear teeth 48 thereon. In FIGS. 2 and 3, the gear teeth 48 are oriented toward the extension 74. Alternatively, the gear teeth 48 may be oriented away from the extension 74. Preferably, the anti-rotation gear 40 is constructed from a single piece of plastic, but other configurations are possible. In positioning the anti-rotation gear 40 inside the body 66, the extension 74 is inserted into the receptor 68. As shown in FIGS. 5 and 6, the extension 74 preferably snap fits into the receptor 68. Inserting the extension 74 into the receptor 68 causes the head 76 to abut the recess 70. As shown in FIG. 3, the recess 70 has at least one flex point 56. The flex point 56 may take a variety of forms. For example, it has been found effective for the recess to have three flex points 56 as shown in FIG. 7, but other numbers of flex points 56 may be used. The flex point 56 interacts with and functionally engages the anti-rotation gear 40. As shown in FIG. 8, the flex point 56 interacts with the gear teeth 48. The flex point 56 allows the anti-rotation gear 40 to rotate when the adjuster 30 is manually operated via the driver 41, but prevents the anti-rotation gear 40 from rotating when the adjuster 30 is operated via the motor 36. Alternatively, the interference between the anti-rotation gear 40 and the housing 32, or other interferences within the device, may be great enough to prevent rotation of the anti-rotation gear 40 when the adjuster 30 is operated via the motor 36. In such an embodiment, the adjuster 30 does not have any flex points 56 positioned therein.

As shown in FIG. 7, the adjuster 30 is manually operated by actuating a driver 41 inserted into the driver input locator 72 (see, e.g., FIG. 2). The driver 41 can be locked in place by a driver retainer 94 positioned in the driver input locator 72. The driver 41 preferably has a groove 95 positioned thereon that snap fits into the driver retainer 94. The driver 41 functionally engages the gear teeth 48 of the anti-rotation gear 40. The gear teeth 48 are configured to functionally interact and geometrically mate with the driver 41, preferably with driver teeth 50 as shown. Actuating the driver 41 causes the anti-rotation gear 40 to rotate. Ideally, the head 52 of the driver 41 can be engaged and turned by a tool such as a wrench, screwdriver, or TORX® driver. Alternatively, the driver 41 itself can be a tool such as a flat head, Phillips head, or a TORX® driver, depending on the configuration of the gear teeth 48.

As shown in FIGS. 2-6, the output shaft 38 is inserted through the anti-rotation gear 40 and extends past the nose 64 of the housing 32. The output shaft 38 has a lamp end 78, at least one rotation point 46, and a driver end 82. The lamp end 78 of the output shaft 38 is engaged to the lamp 21, as shown in FIGS. 11 and 13. The lamp end 78 is engaged to the reflector 24, but other points of attachment to the lamp 21 may be used. The lamp end 78 is ideally engaged to the lamp 21 via a ball 60. The ball 60 can be any material, but it has been found effective for the ball 60 to be constructed of a flexible material such as plastic. Alternatively, the output shaft 38 may be directly engaged to the lamp 21, engaged to a grommet engaged to the lamp 21, and/or may include a ball 60 formed as part of the output shaft 38 or any other form of pivoting mechanism.

Figure 4:
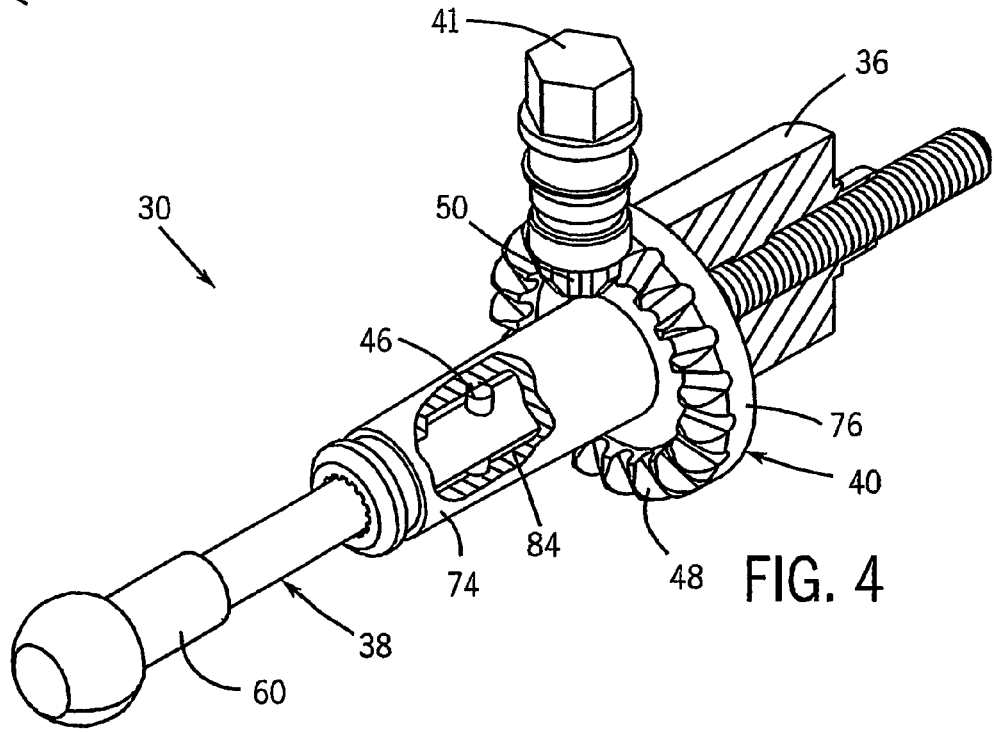
FIG. 4 is a perspective view of the motorized adjuster of FIG. 1, shown with the housing removed and the motor and anti-rotation gear in partial cross-section.
Figure 9:
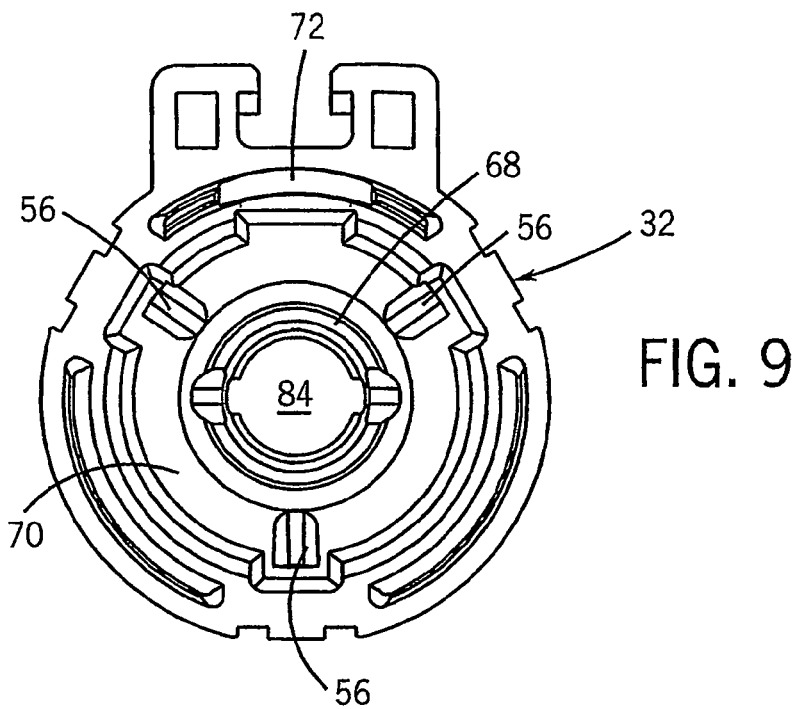
FIG. 9 is a partial cross sectional view of the motorized adjuster of FIG. 3 taken along the plane 9-9 in FIG. 3.
Figure 10:
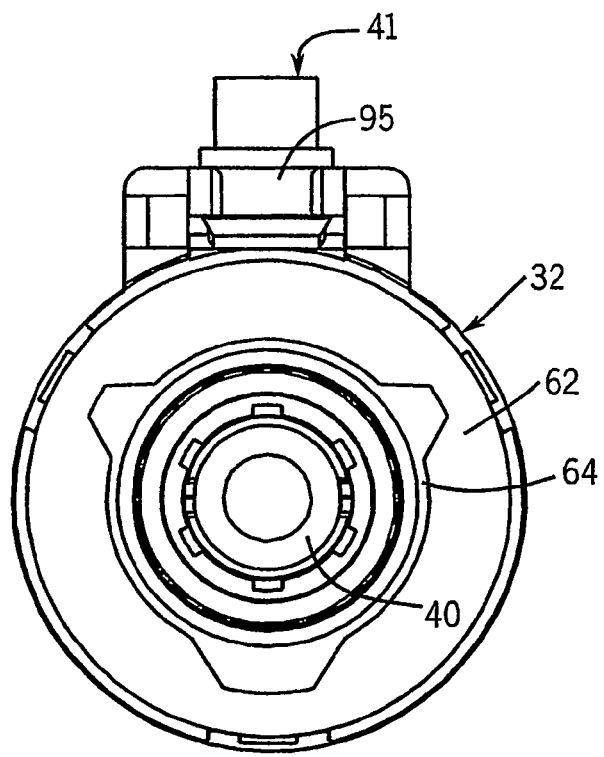
FIG. 10 is a front view of the motorized adjuster of FIG. 1.
Figure 12:
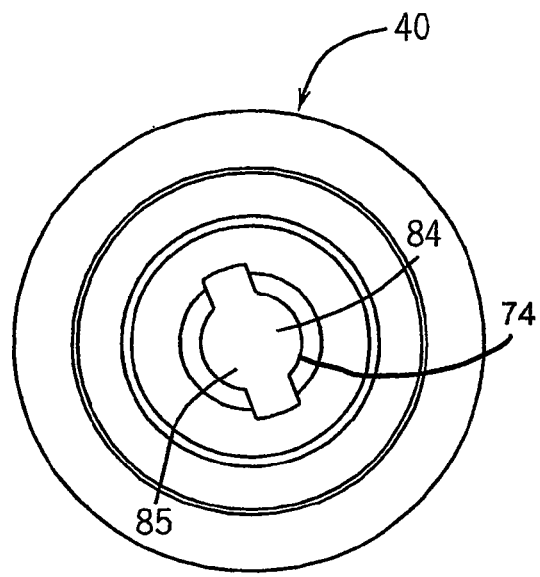
FIG. 12 is a cross sectional view of the motorized adjuster of FIG. 3 taken along the plane 12-12 in FIG. 3.

The output shaft 38 is inserted into, passes through, and is in contact with the anti-rotation gear 40. In FIGS. 2 and 3, the output shaft 38 passes through a bearing 42 fit into the head 76 of the anti-rotation gear 40. The bearing 42 reduces the amount of wear on the anti-rotation gear 40 and the rotor 44 due to the interaction there between. In FIGS. 2 and 3, the output shaft 38 passes through an additional bearing 96 positioned between the rotor 44 and the stator or drive unit 45. The bearings 42 and/or 96 are preferably manufactured from a low friction material such as stainless steel. As shown in FIG. 4, the output shaft 38 has at least one anti-rotation point 46. The anti-rotation point 46 can take a variety of forms, shapes, and numbers depending on the exact configuration and desired characteristics of the adjuster 30. The extension 74 of the anti-rotation gear 40 is configured to geometrically mate with the output shaft 38 and the rotation point 46. In FIGS. 2 and 3, the anti-rotation point 46 is a small bolt inserted through the output shaft 38 at an angle, preferably ninety degrees, relative to the axis of the output shaft 38. Referring to FIGS. 9 and 12, the extension 74 of the anti-rotation gear 40 has an interior 84 with a central round opening 85. The output shaft 38 inserts through the central round opening 85. The rotation point 46 functionally engages the anti-rotation gear 40. Rotation of the anti-rotation gear 40 causes the interior 84 of the extension 74 to come into contact with the rotation point 46. The interior 84 exerts a force on the rotation point 46, thus rotating the output shaft 38. Therefore as shown in FIG. 7, the anti-rotation gear 40 and output shaft 38 rotate as a single unit.

As shown in FIGS. 5 and 6, the driver end 82 of the output shaft 38 is inserted in and engaged to the motor 36. The motor 36 includes a rotor 44 and a drive unit 45. As shown in FIG. 2, the drive unit 45 has a stator 93 and a connector 92. As shown in FIGS. 2, 5, and 6, the rotor 44 is positioned inside the drive unit 45. The driver end 82 and the rotor 44 are threaded together. The driver end 82 is threaded into the rotor 44.

The adjuster 30 can be operated either manually or via the motor 36. In the embodiment shown in FIGS. 1-13, the adjuster 30 adjusts the aim of the lamp 21 via axial movement of the output shaft 38. As shown in FIG. 11, the housing 32 of the adjuster 30 is engaged to the mounting bracket 28. The output shaft 38 of the adjuster 30 is engaged to the lamp 21, preferably via ball 60. As shown in FIGS. 5 and 6, operation of the adjuster 30 causes the output shaft 38 to move axially. Such movement results in pivoting of the lamp 21, thereby adjusting the aim of the lamp 21. Manual operation is accomplished by actuating the driver 41 positioned in the body 66 of the housing 32. Actuating the driver 41 results in rotation of the anti-rotation gear 40 and the output shaft 38. Rotation of the output shaft 38 causes the output shaft 38 to move along its axis, as it is threaded through the rotor 44 that is fixed during manual operation. Rotation of the output shaft 38 in one direction causes the output shaft 38 to extend towards the lamp 21. Rotation in the opposite direction causes the output shaft 38 to retract from the lamp 21. As such, rotation of the output shaft 38 results in axial movement of the output shaft 38. Motorized operation is accomplished by actuation of the motor 36 engaged to the driver end 82 of the output shaft 38. Actuation of the motor 36 causes the rotor 44 to rotate therein. As discussed, the driver end 82 and the rotor 44 are threaded together. The anti-rotation gear 40 prevents the output shaft 38 from rotating during motorized operation of the adjuster 30. Therefore, rotation of the threaded rotor 44 about the threaded portion of the output shaft 38 results in the output shaft 38 moving along its axis.

Another embodiment of the adjuster 30 of the present invention is illustrated in FIGS. 14-31. The adjuster 30 shown in FIGS. 14-31 includes a number of the same parts as the embodiment of FIGS. 1-13, and unless described otherwise herein, the common parts perform the same functions and can take the same form in each embodiment. As shown in FIGS. 14-17, the adjuster includes a housing 32, a motor 36, and an output shaft 38 inserted through the housing 32 and the motor 36. The housing 32 may be a two-part housing as shown, including a back housing portion 33 and a front housing portion 34. Other housing configurations are certainly possible, however, including a configuration such as the one-piece housing used in the embodiment shown in FIGS. 1-13 or a two-part housing with a simple cover. The front housing portion 34 includes a body 66, a nose 64, and a driver input locator 72. The motor 36 is positioned in, or in engagement with, the housing 32. The motor 36 includes a rotor 44, which is functionally engaged with the output shaft 38 using a threaded connection. The motor 36 also includes a front flange 43. An anti-rotation point 46 is located on the output shaft 38. The output shaft 38 is inserted into and through the motor 36 such that anti-rotation point 46 is disposed within a channel 47 within the motor flange 43. The disposition of the anti-rotation point 46 within the channel 47 allows the output shaft 38 to traverse axially over a distance equal to the length of the channel 47, but prevents the output shaft 38 from rotating. The axial movement of the output shaft 38 is illustrated best in FIGS. 18 and 19. In FIG. 18, the anti-rotation point 46 is located near the middle of channel 47, and, after axial movement of the output shaft 38 caused by motorized operation of the adjuster 30, the anti-rotation point 46 is shown near the front end of the channel 47 in FIG. 19.

Figure 16:
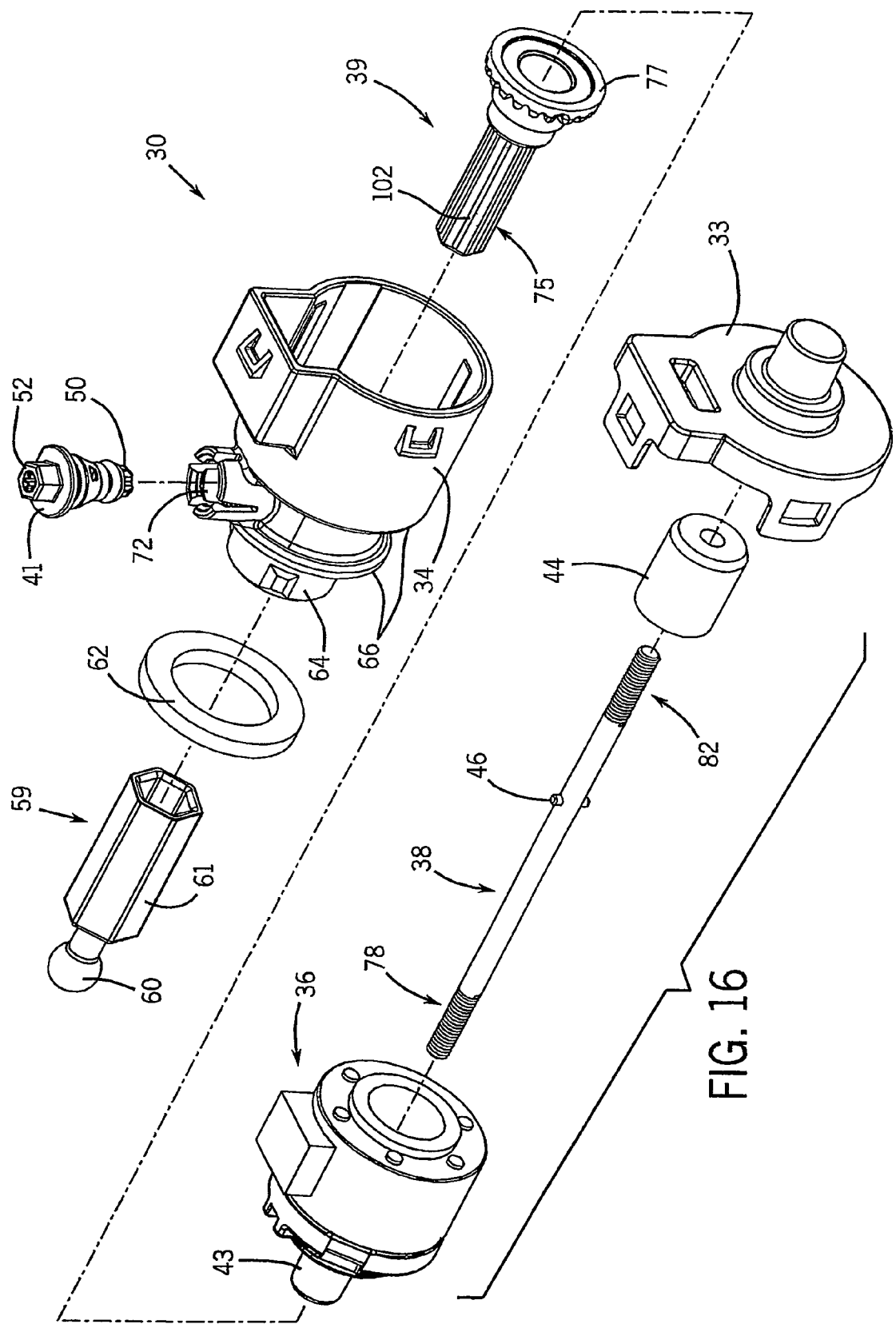
FIG. 16 is an exploded view of the motorized adjuster of FIG. 14.
Figure 24:
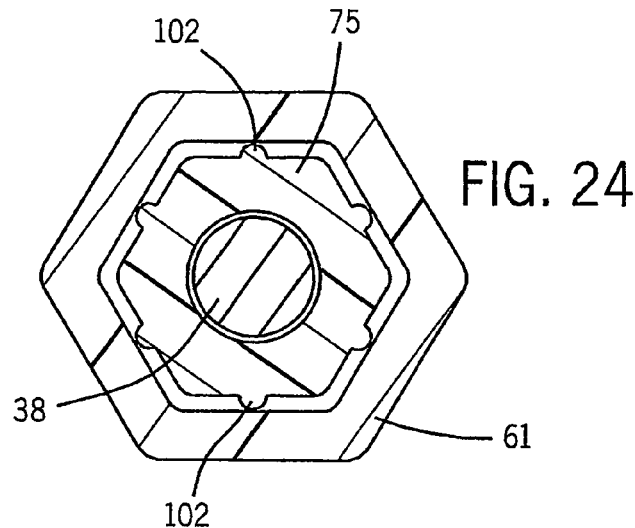
FIG. 24 is a cross-sectional view of the motorized adjuster of FIG. 18 taken along plane 24-24 in FIG. 18.

Referring again to FIGS. 14-17, the output shaft 38 is inserted into and through a drive gear 39 positioned at least partially inside the housing 32. The drive gear 39 is preferably constructed from a single piece of plastic, but other configurations and materials could be used. The output shaft 38 has a driver end 82 that engages the motor 36 and a lamp end 78 that engages the lamp 21 via ball insert 59. The drive gear 39 has an extension 75 and a head 77 having gear teeth 49 formed on one side thereof. FIGS. 15 and 16 show the gear teeth 49 formed on the extension side of the head 77 and thus oriented toward the extension 75, but the gear teeth 49 could be formed on the other side of the head 77 and oriented away from the extension 75. The ball insert 59 includes a ball 60 and an extension 61. The drive gear 39 functionally engages the ball insert 59. To accomplish this, the drive gear extension 75 can include longitudinal splines 102 that engage the ball insert extension 61. FIGS. 14-26 show a drive gear extension 75 having external splines 102 that engage an internal hex geometry of the ball insert 61, as is best shown in FIG. 24. FIGS. 27-31 show a drive gear extension 75 having internal splines 102 that engage clutching tabs 104 formed on the exterior of the ball insert extension 61. Other engagement methods could also be employed.

Figure 21:
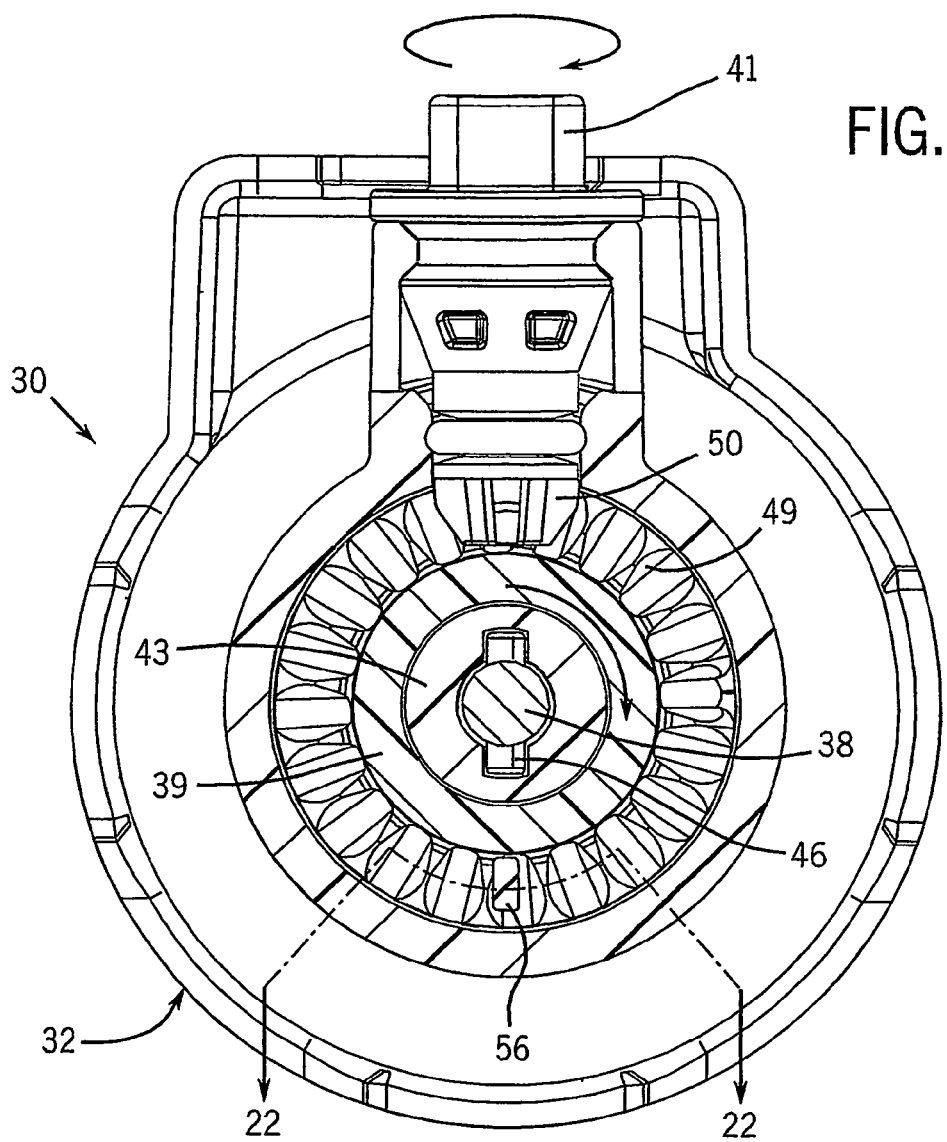
FIG. 21 is a partial cross sectional view of the motorized adjuster of FIG. 18 taken along the plane 21-21 in FIG. 18.
Figure 22:
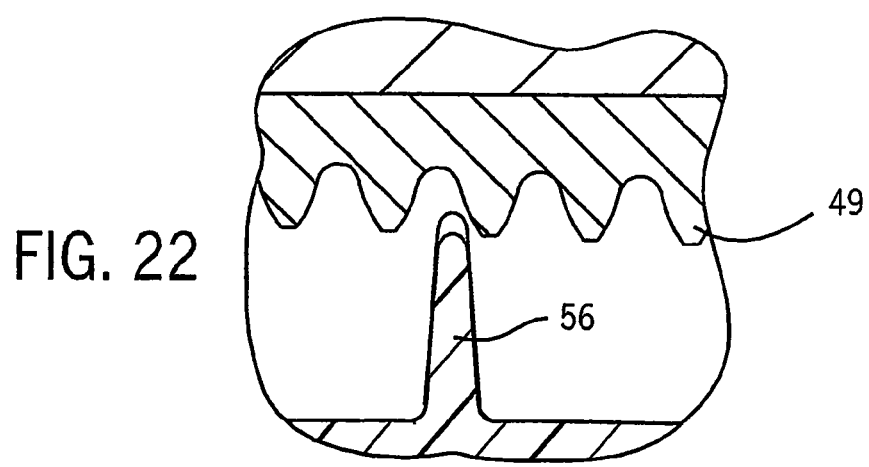
FIG. 22 is a partial cross sectional view of the motorized adjuster of FIG. 21 taken along the plane 22-22 in FIG. 21.
Figure 23:
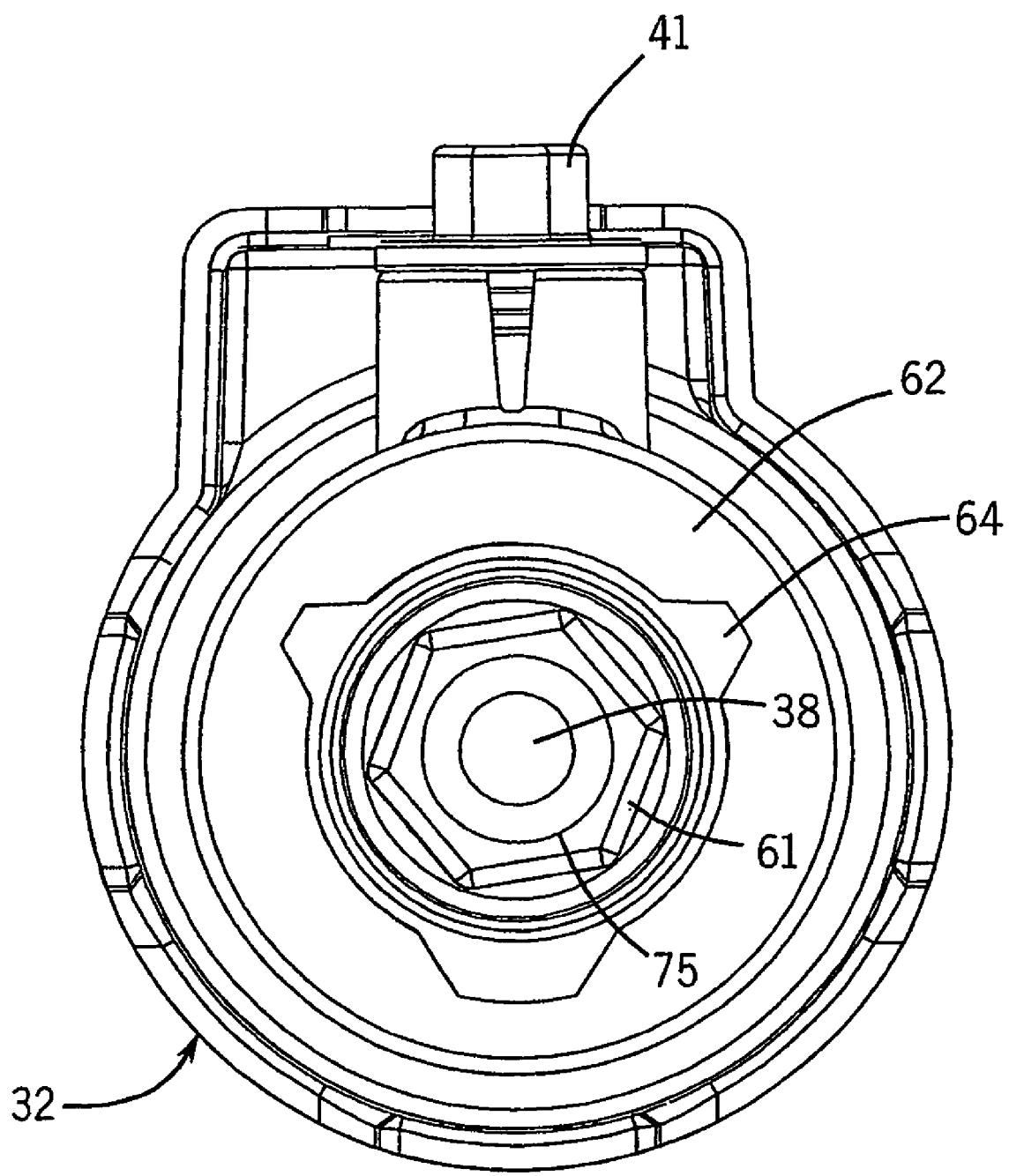
FIG. 23 is a front view of the motorized adjuster of FIG. 14.

A driver 41 having a head 52 and drive teeth 50 is inserted into the driver input locator 72 such that teeth 50 engage the gear teeth 49 of the drive gear 39, as can best be seen in FIGS. 18-21 and 28. As illustrated therein, the driver 41 is used to manually operate the adjuster 30. Manual rotation of the driver 41 effects movement of the ball insert 59. Rotation of the driver 41 causes the drive gear 39 to rotate, which in turn causes the ball insert 59 to rotate. The ball insert 59 is engaged with the output shaft 38 using a threaded connection. As the ball insert 59 rotates, the ball insert 59 moves axially with respect to the output shaft 38, which is fixed during manual operation of the adjuster. Keeping the output shaft 38 in a fixed position during manual operation of the adjuster 30 allows the output shaft 38 to stay in its nominal position during manual operation of the adjuster. Rotating the drive gear 39 in one direction will effect forward axial movement of the ball insert 59, and rotating the drive gear 39 in the other direction will effect backward axial movement of the ball insert 59 as illustrated in FIG. 20. As shown in FIGS. 21 and 22, at least one flex point 56 may be used to ensure that the drive gear 39 cannot rotate unless enough torque is applied to the driver 41 to overcome the resistance imposed on the gear teeth 49 by the flex point 56. The interference between the drive gear 39 and the housing 32 or other interferences within the device could also be great enough to prevent this unwanted rotation of the driver 41 and drive gear 39 without the use of any flex points 56.

If desired for a particular application, clutching tabs 104, as shown in FIGS. 27-31, can be used to prevent the application of excessive torque during manual operation. For example, if a vehicle technician is using the driver 41 to adjust the head lamp, and the ball insert 59 becomes restricted by something the technician cannot see, the technician may continue to apply torque to the driver 41 in an attempt to overcome the restriction. The clutching tabs 104 will, in response to this excessive torque, collapse inwardly and disengage the ball insert 59 from the drive gear 39, thereby clutching the system to prevent mechanical failures due to the excessive torque applied to the driver 41. Likewise, if the output shaft 38 is threaded into the ball insert 59 as far as is possible and thus the ball insert 59 cannot move any further in the backward axial direction, the clutching tabs 104 will clutch the system in response to the application of excessive torque.

During motorized operation of the adjuster, axial movement of the output shaft 38 effects movement of the ball insert 59 as shown best in FIGS. 18 and 19. The rotor 44 of the motor 36 rotates about the output shaft 38, which is engaged thereto using a threaded connection. Anti-rotation point 46 prevents the output shaft 38 from rotating, and thus the output shaft 38 moves along its axis as the rotor 44 rotates. Ball insert 59 is engaged to the output shaft 38, and can slide with respect to the drive gear extension 75. Thus, as the output shaft 38 moves axially, the ball insert 59 moves therewith. Rotation of the rotor 44 in one direction effects forward axial movement of the ball insert 59 as shown in FIG. 19, and rotation of the rotor 44 in the other direction effects backward axial movement of the ball insert 59.

The motorized lamp adjuster 30 of the present invention may have other applications aside from use in connection with vehicle lamp assemblies. Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims.

What is claimed is:

1. A lamp adjuster comprising:
   a housing;
   a motor attached to the housing;
   a drive gear journaled at least partially by the housing;
   an output shaft passing at least partially through and operably connected at a first end to the motor;
   a ball insert functionally engaged to both the drive gear and a second end of the output shaft;
   wherein actuation of the motor causes movement of the output shaft and the ball insert; and
   wherein rotation of the drive gear causes movement of the ball insert without movement of the output shaft.

2. The lamp adjuster of claim 1 wherein the housing includes a drive input locator into which a driver can be inserted for rotating the gear.

3. The lamp adjuster of claim 1 further comprising a clutching mechanism disposed between the ball insert and the drive gear.

4. The lamp adjuster of claim 3 wherein the clutching mechanism includes clutching tabs formed on the ball insert.

5. The lamp adjuster of claim 1 wherein the ball insert includes clutching tabs that engage the drive gear.

6. A lamp assembly comprising:
   a mounting bracket;
   a lamp pivotally positioned on the mounting bracket; and
   an adjuster including a housing, a motor attached to the housing, a drive gear journaled at least partially by the housing, an output shaft passing at least partially through and operably connected to the motor, and a ball insert functionally engaged to both the output shaft and the drive gear, wherein actuation of the motor causes movement of the output shaft and ball insert, and wherein rotation of the drive gear causes movement of the ball insert without movement of the output shaft.

7. The lamp assembly of claim 6 wherein the housing includes a drive input locator into which a driver can be inserted for rotating the gear.

8. The lamp assembly of claim 6 further comprising a clutching mechanism disposed between the ball insert and the drive gear.

9. The lamp assembly of claim 8 wherein the clutching mechanism includes clutching tabs formed on the ball insert.

10. The lamp assembly of claim 6 wherein the ball insert includes clutching tabs that engage the drive gear.

* * * * *